(12) United States Patent
Yasui

(10) Patent No.: US 8,064,145 B2
(45) Date of Patent: Nov. 22, 2011

(54) OPTICAL SYSTEM AND OPTICAL APPARATUS USING THE SAME

(75) Inventor: Hiroto Yasui, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 457 days.

(21) Appl. No.: 12/367,211

(22) Filed: Feb. 6, 2009

(65) Prior Publication Data

US 2009/0201585 A1    Aug. 13, 2009

(30) Foreign Application Priority Data

Feb. 8, 2008 (JP) ................................. 2008-028767

(51) Int. Cl.
*G02B 15/14* (2006.01)
(52) U.S. Cl. ........................................ 359/691; 359/676
(58) Field of Classification Search .................. 359/558, 359/566, 569, 570, 573–576, 642, 661, 676, 359/680–682, 684, 686–692, 707, 717, 742–743, 359/754, 793–797
See application file for complete search history.

(56) References Cited

U.S. PATENT DOCUMENTS

| | | | |
|---|---|---|---|
| 5,959,785 A * | 9/1999 | Adachi | ................. 359/692 |
| 6,115,188 A | 9/2000 | Nishio | |
| 6,381,079 B1 | 4/2002 | Ogawa | |
| 7,136,237 B2 | 11/2006 | Ogawa | |
| 7,193,789 B2 | 3/2007 | Maetaki | |
| 7,253,973 B2 | 8/2007 | Yasui | |
| 7,426,083 B2 | 9/2008 | Endo | |
| 2001/0055157 A1 * | 12/2001 | Shirasuna | ................. 359/566 |

* cited by examiner

*Primary Examiner* — Stephone B Allen
*Assistant Examiner* — Kimberly N Kakalec
(74) *Attorney, Agent, or Firm* — Canon U.S.A., Inc. I.P. Division

(57) ABSTRACT

An optical system includes a front lens group, a stop, and a rear lens group arranged successively in order from the object side toward the image side. The front lens group includes a solid material element having a refractive action. The rear lens group includes a diffractive optical element. The solid material element is formed on at least one transmissive surface of a refractive optical element. An Abbe number of a solid material of the solid material element with respect to the d line, a partial dispersion ratio of the solid material with respect to the g line and the F line, respective thicknesses of the solid material element and the refractive optical element when measured on the optical axis, and respective focal lengths of the diffractive optical portion of the diffractive optical element and the solid material element in air satisfy predetermined conditional expressions.

9 Claims, 18 Drawing Sheets

OPTICAL SYSTEM AND OPTICAL APPARATUS USING THE SAME

BACKGROUND OF THE INVENTION

1. Field of the Invention

The present invention relates to an optical system. More particularly, the present invention relates to an optical system suitable for use in an optical apparatus, such as a silver-halide film camera, a digital still camera, a video camera, a telescope, a binocular, a projector, or a copying machine.

2. Description of the Related Art

An optical system used in an optical apparatus, such as a digital camera, a video camera, or a projector, is required to have a short overall lens length (i.e., a length from a first lens surface on the object side to an image plane) corresponding to reduction in size of the optical apparatus. However, as the overall lens length reduces, various aberrations tend to increase. In particular, axial chromatic aberration and transverse chromatic aberration are increased, thus resulting in deterioration of optical performance.

Known techniques for reducing chromatic aberrations of an optical system include a method of using an anomalous partial dispersion material as an optical member and a method of using a diffractive optical element having a diffractive action (see U.S. Pat. Nos. 6,115,188, 7,136,237, 7,193,789, 6,381,079, 7,426,083, and 7,253,973).

In U.S. Pat. No. 6,115,188, the chromatic aberrations are satisfactorily corrected by using a material having anomalous partial dispersion at a low level of dispersion, such as fluorite, to form a positive lens, and by using a high dispersion material to form a negative lens.

In U.S. Pat. Nos. 7,136,237 and 7,193,789, the chromatic aberrations are satisfactorily corrected by using, as the anomalous partial dispersion material, a fine-particle dispersed material that is prepared by mixing fine particles, such as ITO or $TiO_2$, in a resin material, or a resin material having an anomalous partial dispersion characteristic.

To considerably correct the chromatic aberrations, which are increased when the overall lens length is reduced, by using the lens made of the low dispersion material, such as fluorite, refractive power of the lens surface has to be changed to a large extent. It is therefore important to appropriately set the refractive power and to arrange the lens surface at an appropriate position in the optical system. If the refractive power and the arranged position of the lens surface are inappropriate, a difficulty arises in correcting various aberrations, such as spherical aberration, coma aberration, and astigmatism, while realizing correction of the chromatic aberrations.

The diffractive optical element has a very small absolute value as a numerical value corresponding to the Abbe number. Accordingly, just by slightly changing diffractive power (inverse number of the focal length), the chromatic aberrations can be largely changed without substantially affecting the spherical aberration, the coma aberration, and the astigmatism.

In U.S. Pat. Nos. 6,381,079, 7,426,083, and 7,253,973, the chromatic aberrations are corrected by utilizing a negative dispersion characteristic and strong anomalous dispersion of the diffractive optical element.

However, if there is diffracted light at unnecessary orders of diffraction other than desired imaging light, the diffracted light becomes flare light that largely deteriorates the image-forming performance. For example, if a light source with high brightness is present in an object, a flare due to the unnecessary diffracted light appears around the light source. Also, if strong light coming from the outside of a frame, e.g., the sunlight, enters the diffractive optical element, a flare is generated and contrast of the entire frame is reduced. For that reason, when the diffractive optical element is used, it has to be arranged at an appropriate position in the optical system with appropriate diffractive power.

SUMMARY OF THE INVENTION

According to an aspect of the present invention, an optical system satisfactorily corrects various aberrations including chromatic aberrations and which has a small overall size and high optical performance. According to another exemplary embodiment of the present invention, an optical apparatus includes such an optical system.

According to another exemplary embodiment of the present invention, an optical system includes a front lens group, a stop, and a rear lens group, which are arranged successively in order from the object side toward the image side. The front lens group includes a refractive optical element and a solid material element having a refractive action. The solid material element is formed on at least one transmissive surface of the refractive optical element. The rear lens group includes a diffractive optical element. Furthermore, the following conditional expressions are satisfied:

$$vd < 60,$$

$$dn/dg < 0.50,$$

$$0.01 < |fn/fd| < 0.80, \text{ and either}$$

$$\theta gF < (-1.665 \times 10^{-7} \cdot vd^3 + 5.213 \times 10^{-5} \cdot vd^2 - 5.656 \times 10^{-3} \cdot vd + 0.700) \text{ or}$$

$$\theta gF > (-1.665 \times 10^{-7} \cdot vd^3 + 5.213 \times 10^{-5} \cdot vd^2 - 5.656 \times 10^{-3} \cdot vd + 0.755),$$

where vd is an Abbe number of a solid material of the solid material element with respect to the d line, dn and dg are respectively a thickness of the solid material element and a thickness of the refractive optical element when measured on the optical axis, fd and fn are respectively a focal length of a diffractive optical portion of the diffractive optical element and a focal length of the solid material element in air, and θgF is a partial dispersion ratio of the solid material with respect to the g line and the F line.

Further features of the present invention will become apparent from the following description of exemplary embodiments with reference to the attached drawings.

DESCRIPTION OF THE EMBODIMENTS

An optical system and an optical apparatus including the optical system, according to exemplary embodiments of the present invention, will be described below. The optical system according to the exemplary embodiments of the present invention is a lens system having a single focal length or a zoom lens. The lens system or the zoom lens includes a front lens group, a stop (aperture stop), and a rear lens group, which are arranged in order from the object side toward the image side. The front lens group includes a solid material element made of a solid material and having a refractive action, and the rear lens group includes a diffractive optical element.

The solid material element is formed on at least one of two transmissive surfaces, i.e., light incident and emergent surfaces, of a refractive optical element, such as a lens.

Figure 1:
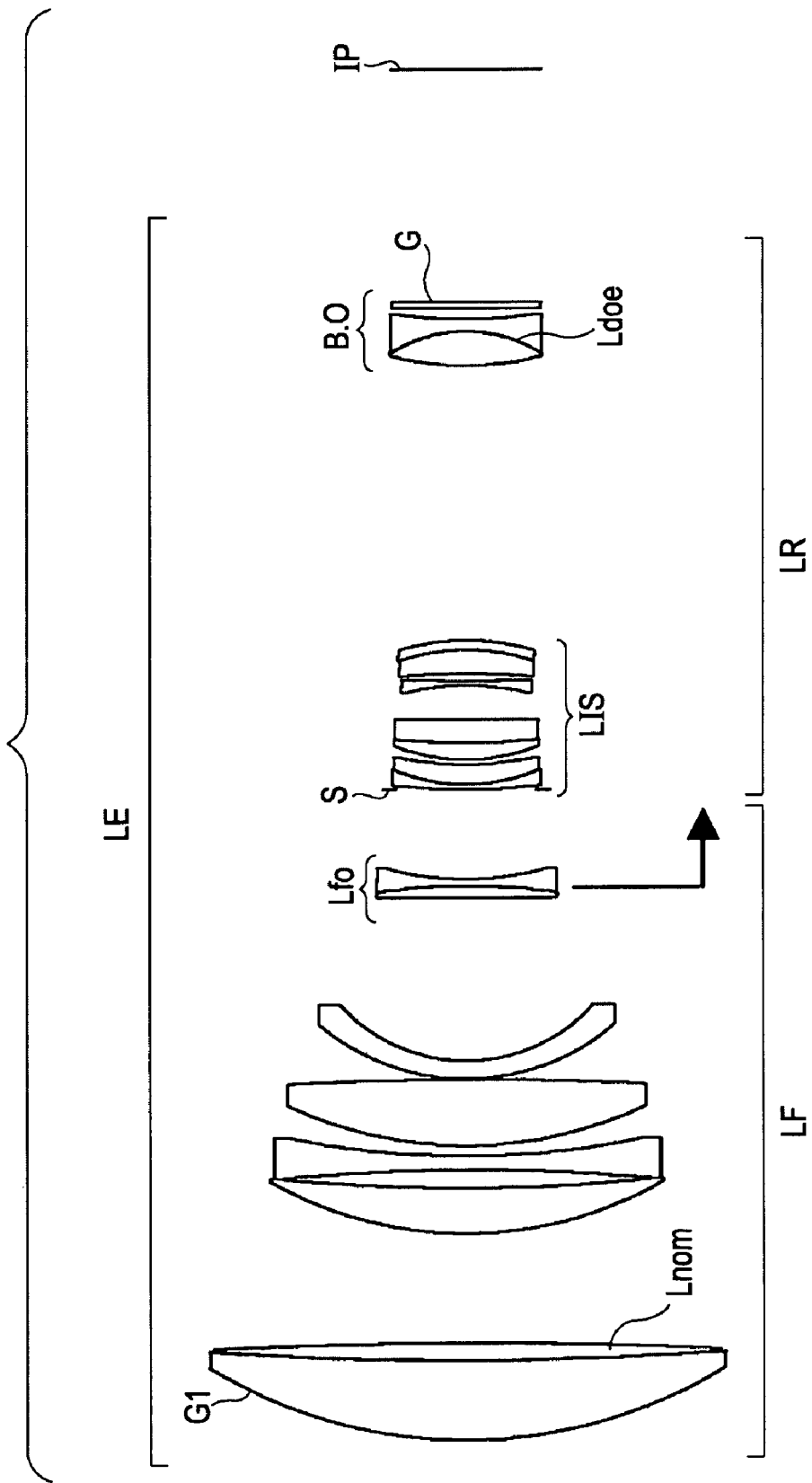
FIG. 1 is a sectional view of an optical system according to a first exemplary embodiment (Numerical Example 1) of the present invention.
Figure 2:
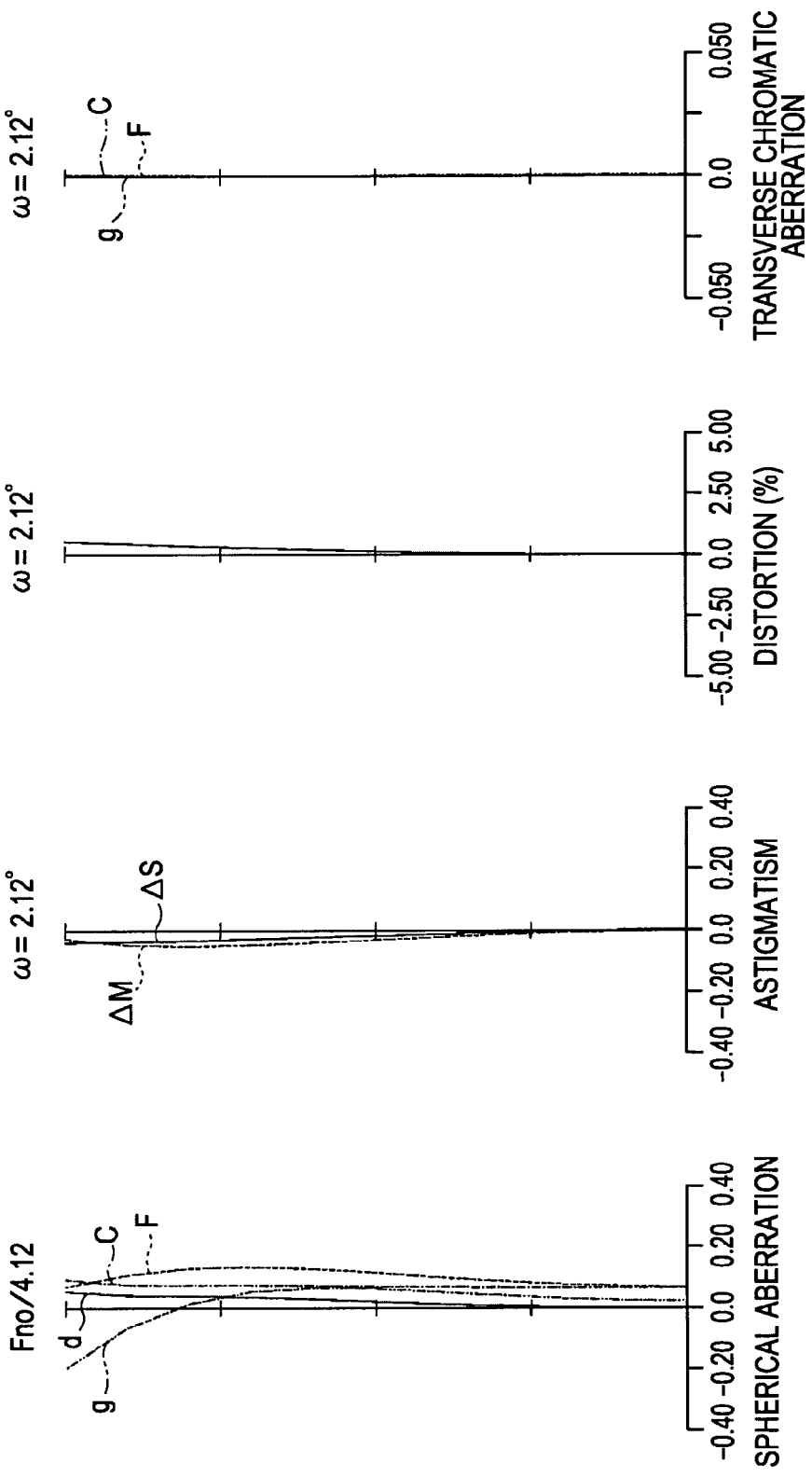
FIG. 2 illustrates aberrations of the optical system according to the first exemplary embodiment (Numerical Example 1) of the present invention.

FIG. 1 is a sectional view of an optical system according to a first exemplary embodiment (Numerical Example 1) of the present invention. FIG. 2 illustrates aberrations of the optical system according to the first exemplary embodiment of the present invention and represents the case where the object distance is at infinity. The optical system according to the first exemplary embodiment has a single focal length.

Figure 3:
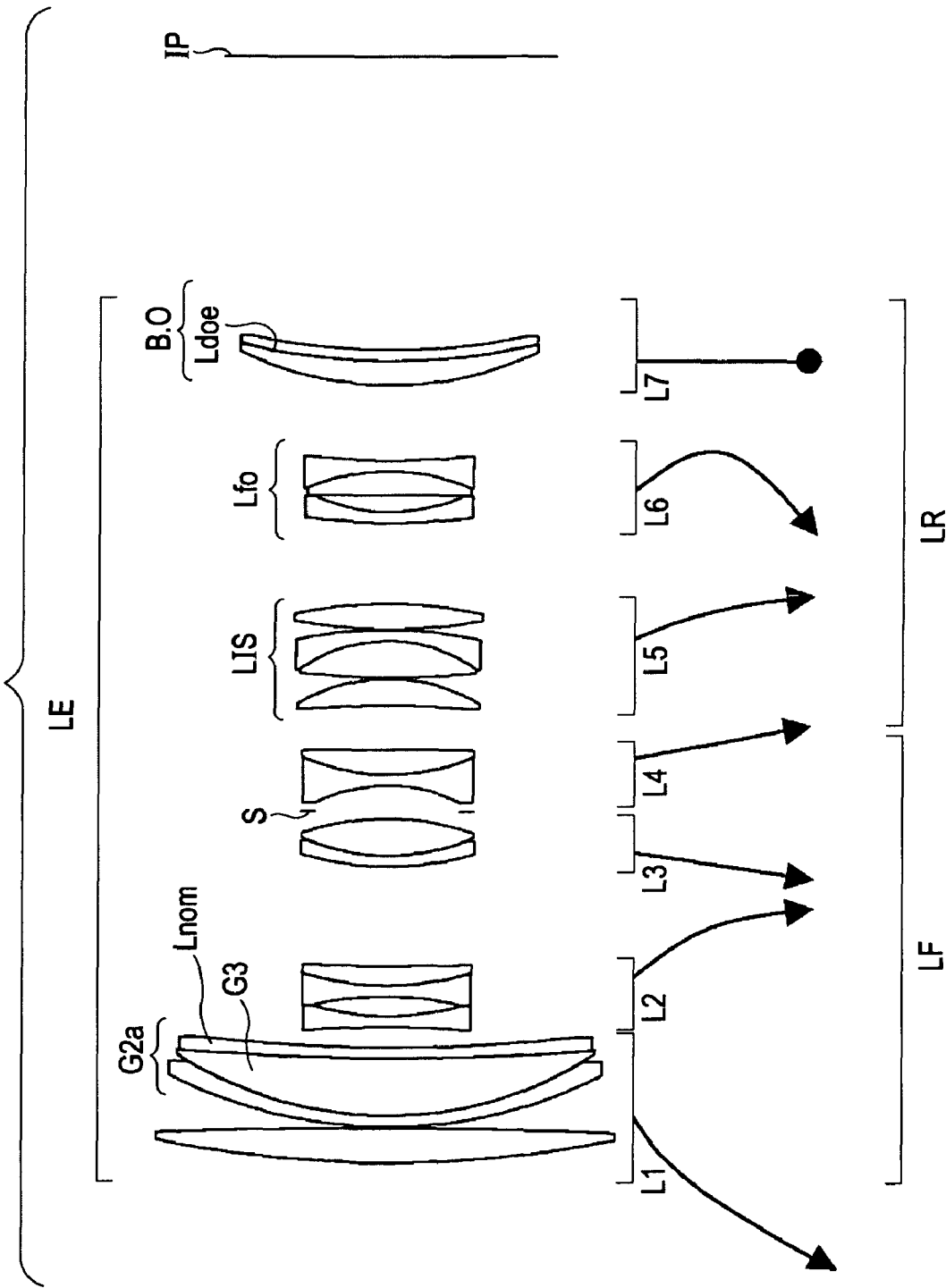
FIG. 3 is a sectional view, at a wide-angle end, of an optical system according to a second exemplary embodiment (Numerical Example 2) of the present invention.
Figure 4:
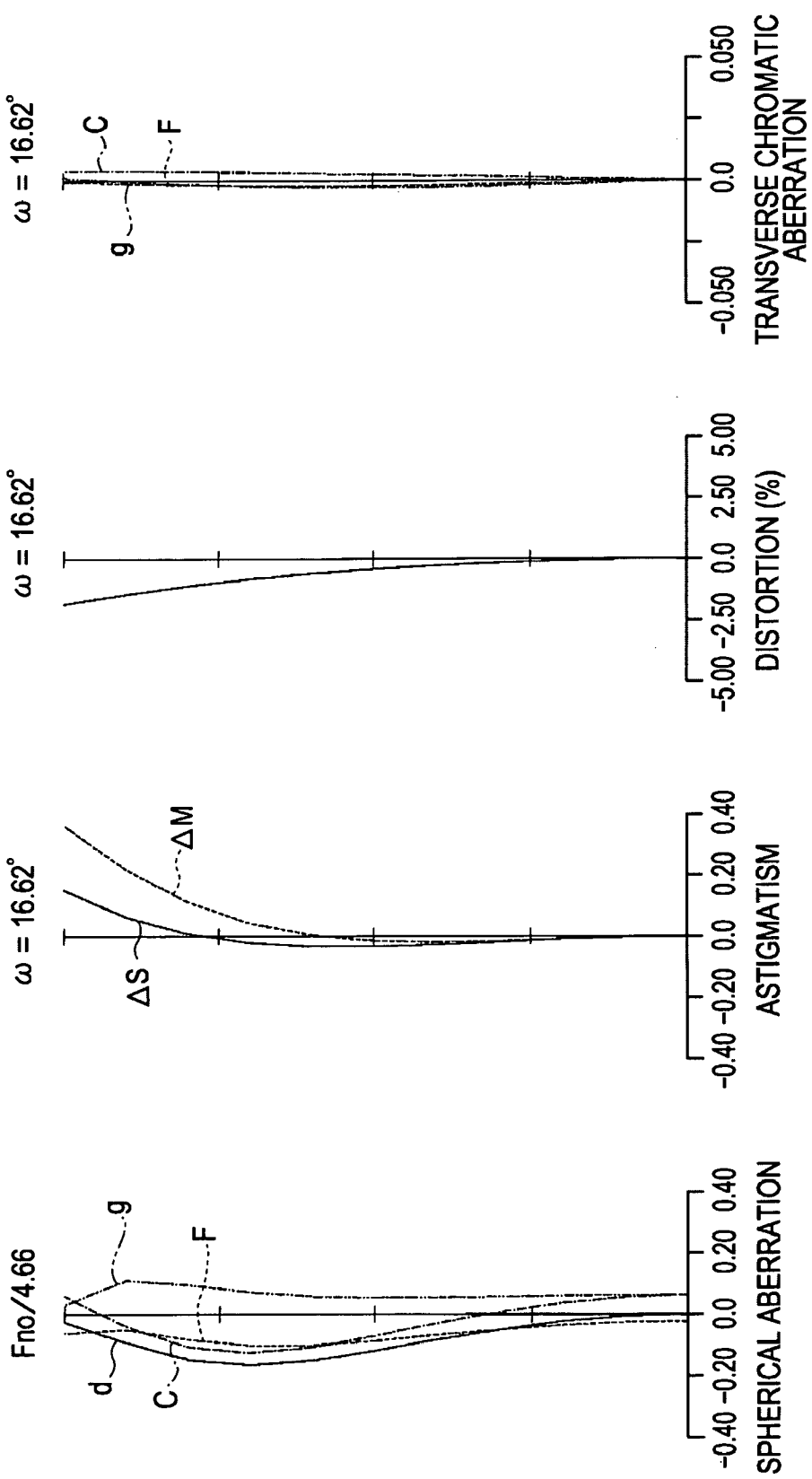
FIG. 4 illustrates aberrations, at the wide-angle end, of the optical system according to the second exemplary embodiment (Numerical Example 2) of the present invention.
Figure 5:
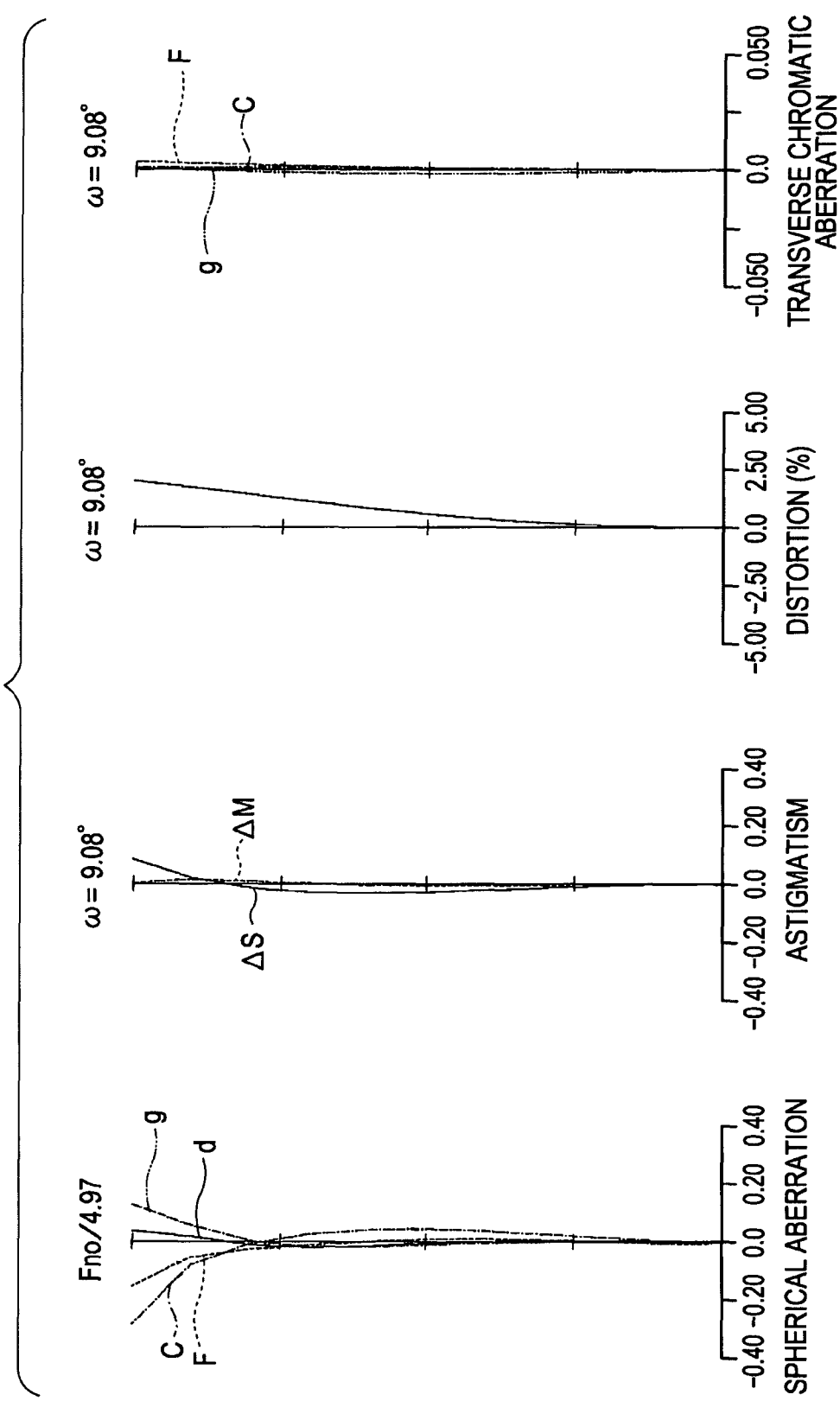
FIG. 5 illustrates aberrations, at an intermediate zooming position, of the optical system according to the second exemplary embodiment (Numerical Example 2) of the present invention.
Figure 6:
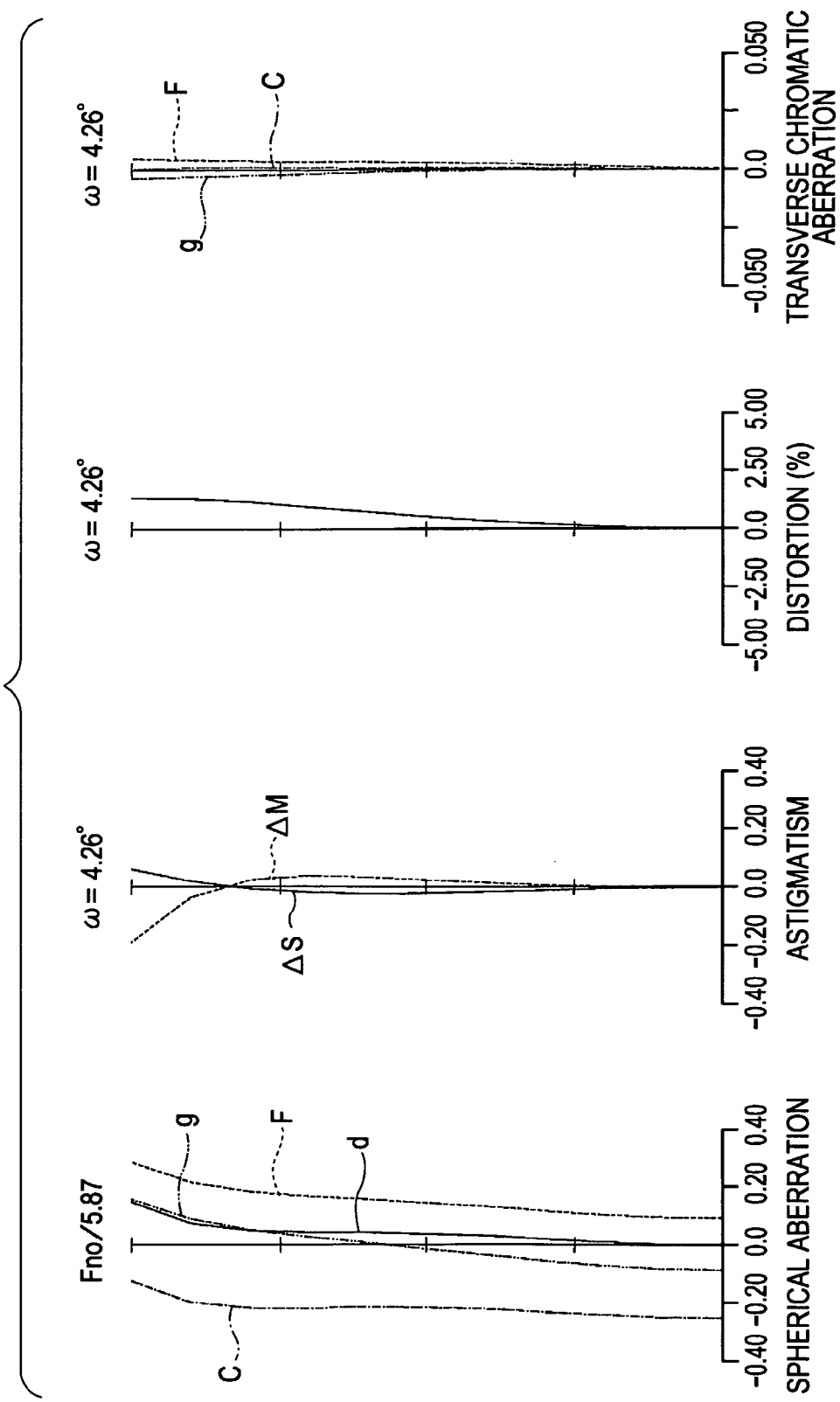
FIG. 6 illustrates aberrations, at a telephoto end, of the optical system according to the second exemplary embodiment (Numerical Example 2) of the present invention.

FIG. 3 is a sectional view, at a wide-angle end (i.e., at an end corresponding to the shortest focal length), of an optical system according to a second exemplary embodiment (Numerical Example 2) of the present invention. FIGS. 4 to 6 illustrate aberrations of the optical system according to the second exemplary embodiment of the present invention. In each of FIGS. 4 to 6, the object distance is at infinity. FIGS. 4 to 6 represent respectively the cases where the optical system is at the wide-angle end, an intermediate zooming position, and a telephoto end (i.e., an end corresponding to the longest focal length).

Figure 7:
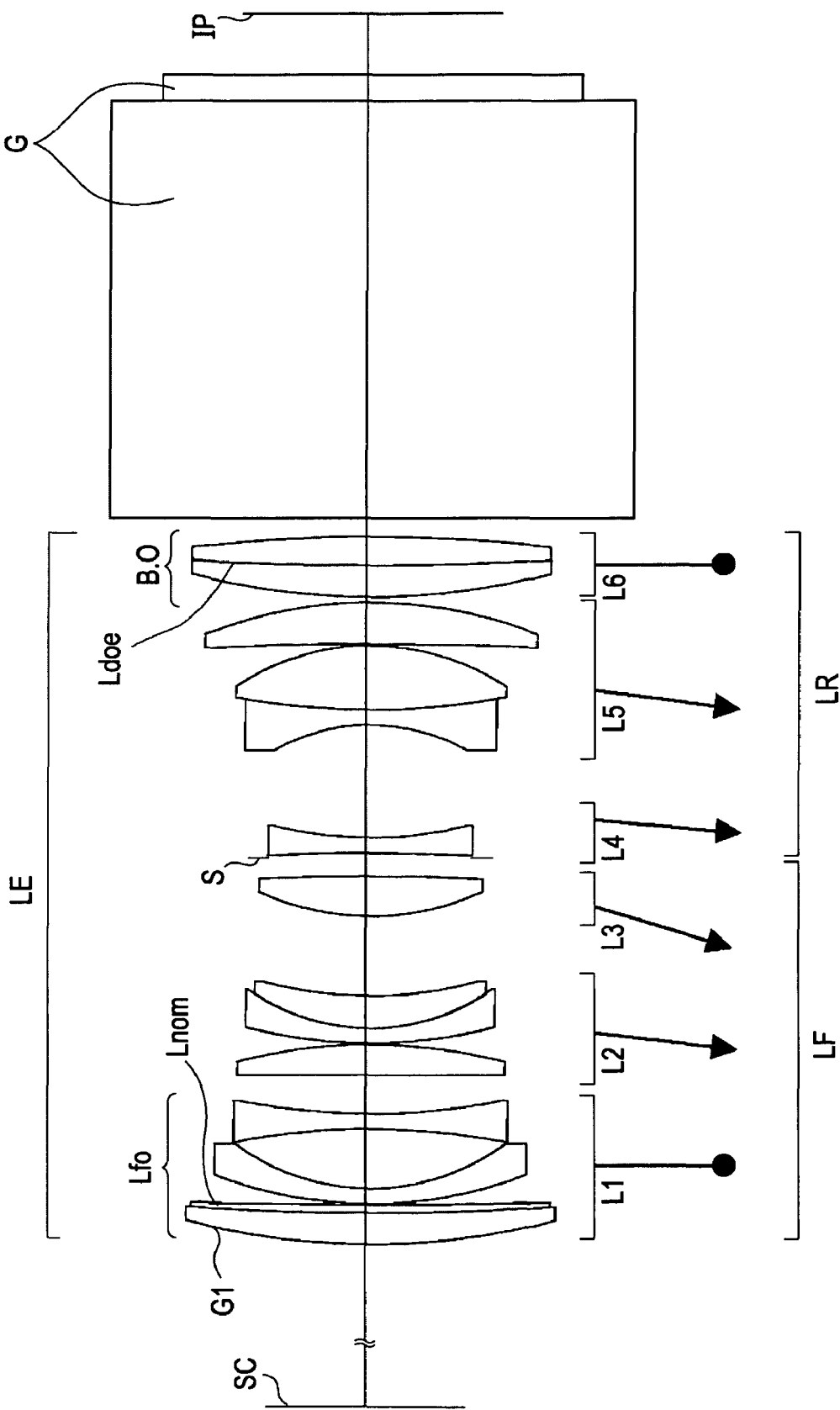
FIG. 7 is a sectional view, at a wide-angle end, of an optical system according to a third exemplary embodiment (Numerical Example 3) of the present invention.
Figure 8:
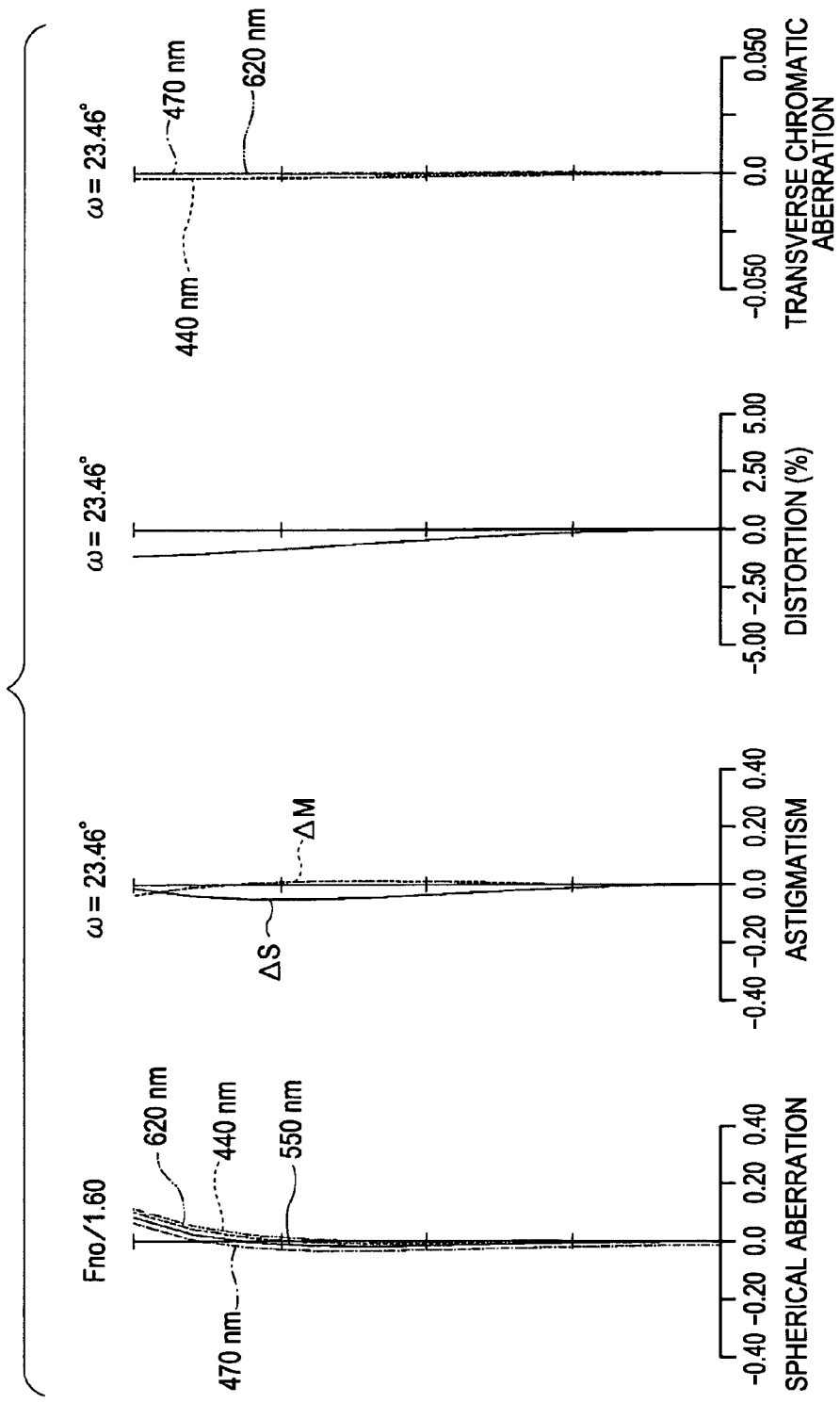
FIG. 8 illustrates aberrations, at the wide-angle end, of the optical system according to the third exemplary embodiment (Numerical Example 3) of the present invention.
Figure 9:
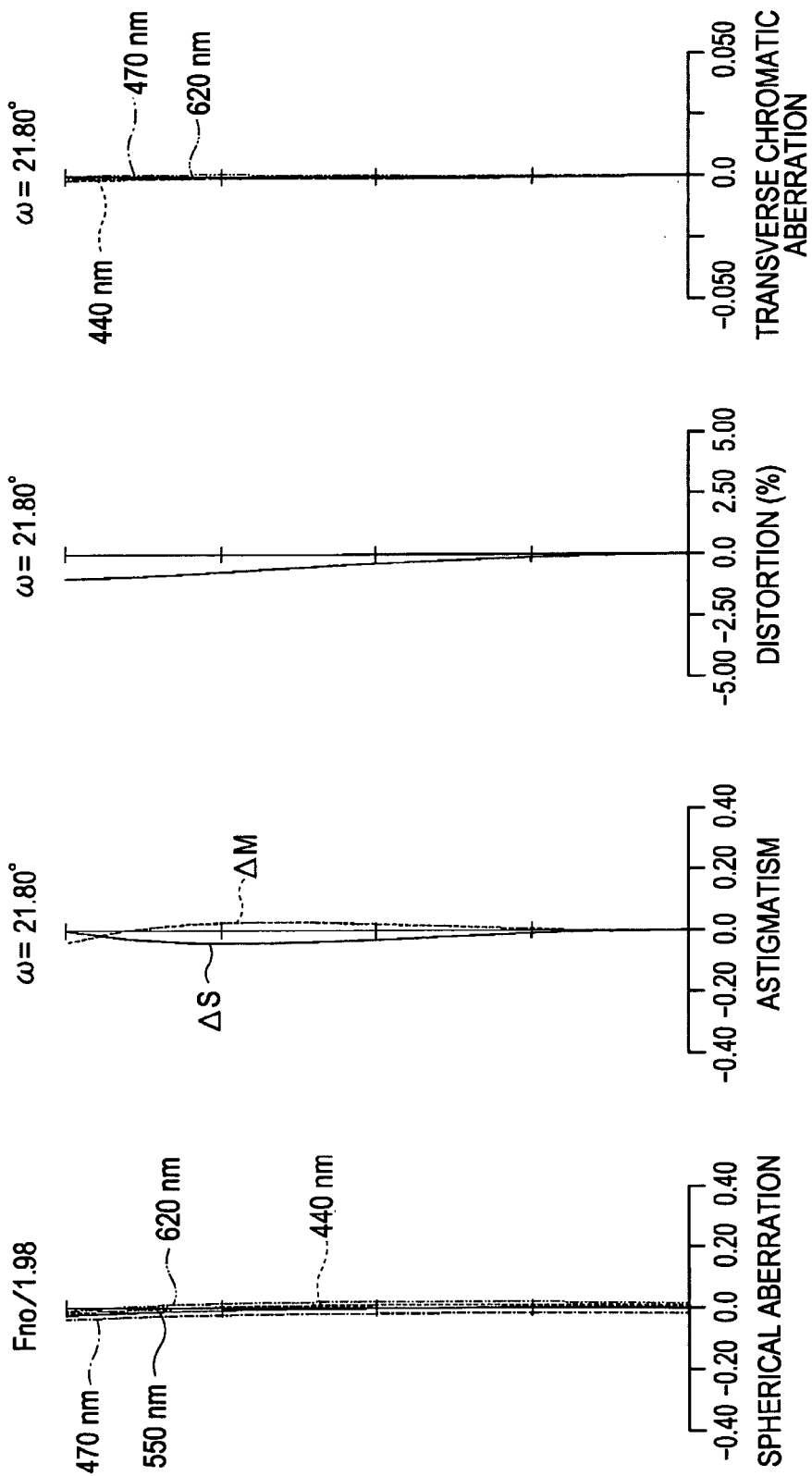
FIG. 9 illustrates aberrations, at an intermediate zooming position, of the optical system according to the third exemplary embodiment (Numerical Example 3) of the present invention.
Figure 10:
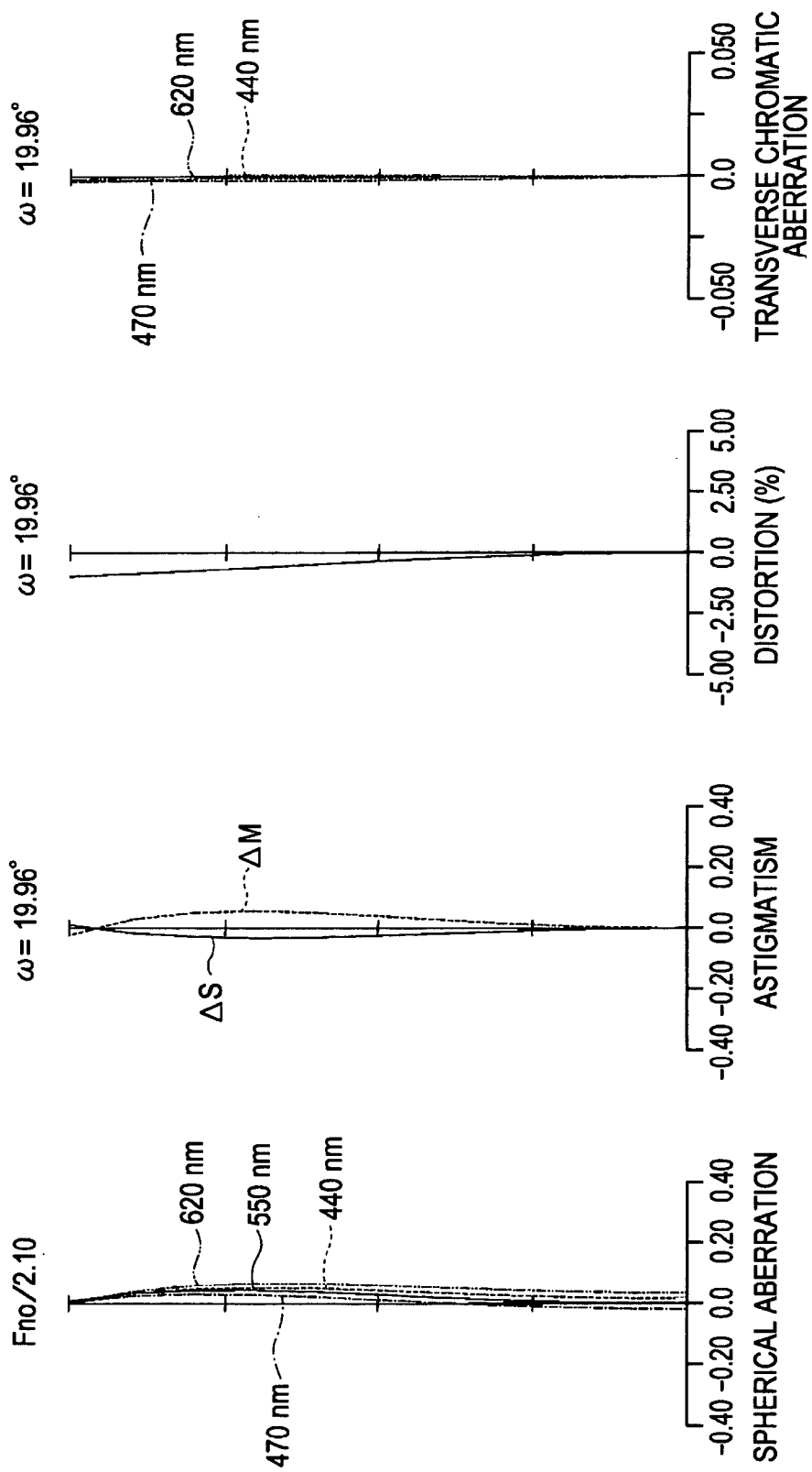
FIG. 10 illustrates aberrations, at a telephoto end, of the optical system according to the third exemplary embodiment (Numerical Example 3) of the present invention.

FIG. 7 is a sectional view, at a wide-angle end, of an optical system according to a third exemplary embodiment (Numerical Example 3) of the present invention. FIGS. 8 to 10 illustrate aberrations of the optical system according to the third exemplary embodiment of the present invention. In each of FIGS. 8 to 10, the object distance is at infinity. FIGS. 8 to 10 represent respectively the cases where the optical system is at the wide-angle end, an intermediate zooming position, and a telephoto end.

Figure 18:
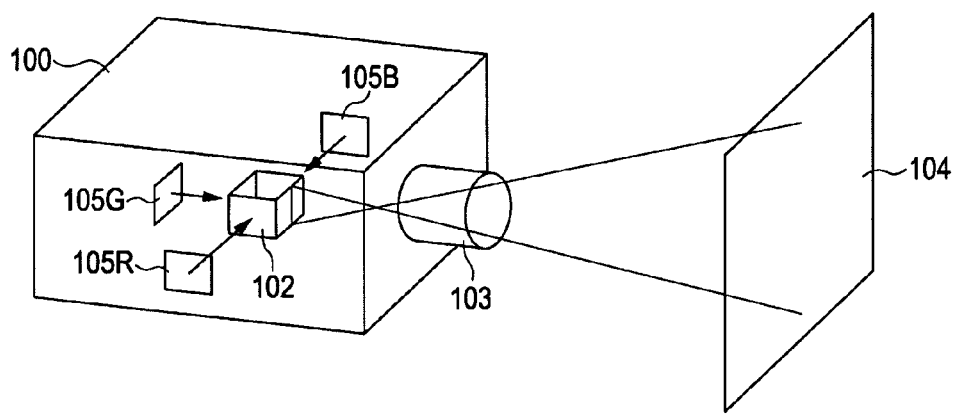
FIG. 18 is schematic view of principal parts of a liquid crystal projector including an optical system according to an exemplary embodiment of the present invention.

FIG. 18 is schematic view of principal parts of an image projection apparatus, such as a projector, to which an optical system according to an exemplary embodiment of the present invention is applied.

Figure 19:
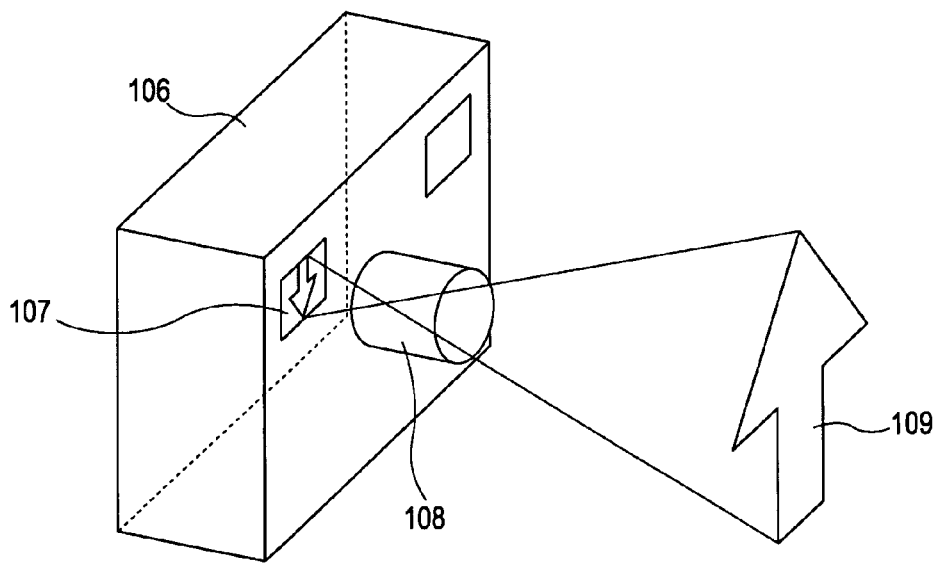
FIG. 19 is schematic view of principal parts of an image pickup apparatus including an optical system according to an exemplary embodiment of the present invention.

FIG. 19 is schematic view of principal parts of an image pickup apparatus, such as a digital camera, to which an optical system according to an exemplary embodiment of the present invention is applied.

An optical system according to any of the exemplary embodiments of the present invention can be used in an optical apparatus, such as a digital camera, a video camera, a silver-halide film camera, a telescope, a binocular-type observation apparatus, a copying machine, or a projector.

In each of the lens sectional views, the left represents the front (object side or enlargement side), and the right represents the rear (image side or reduction side)

When the optical system is used in an image projection apparatus, such as a projector, the left corresponds to the screen side and the right corresponds to the projected image side. In each sectional view, LE denotes the optical system.

S denotes the stop (aperture stop) for adjusting light quantity. LF denotes the front lens group positioned closer to the object side than the aperture stop S. The front lens group LF includes a single or a plurality of lens units.

LR denotes the rear lens group positioned closer to the image side than the aperture stop S. The rear lens group LR includes a single or a plurality of lens units.

Assuming that i indicates the order counting from the object side, Li represents an i-th lens unit.

IP denotes an image plane. When the optical system is used as an imaging optical system for a video camera or a digital still camera, a photosensitive surface corresponding to an imaging surface of a solid-state image pickup element (photoelectric conversion element), such as a CCD sensor or a CMOS sensor, is disposed in the image plane IP.

In FIGS. 1 and 7, G denotes a glass block including various filters, a faceplate, and a color separation prism.

In FIGS. 3 and 7, an arrow denotes a locus of movement of each lens unit in zooming from the wide-angle end to the telephoto end.

In FIGS. 2 and 4 to 6 each illustrating the aberrations, among various lines representing spherical aberration, a solid line d corresponds to the d line, a two-dot chain line g corresponds to the g line, a one-dot chain line C corresponds to the C line, and a dotted line F corresponds to the F line.

Also, among various lines representing astigmatism, a solid line indicates an image plane $\Delta S$ due to a sagittal ray, and a dotted line indicates an image plane $\Delta M$ due to a meridional ray.

Among lines representing transverse chromatic aberration, a two-dot chain line g corresponds to the g line, a one-dot chain line C corresponds to the C line, and a dotted line F corresponds to the F line.

In FIGS. 8 to 10 each illustrating the aberrations, among various lines representing spherical aberration, a solid line corresponds to a wavelength of 550 nm, a two-dot chain line corresponds to a wavelength of 620 nm, a one-dot chain line corresponds to a wavelength of 470 nm, and a dotted line corresponds to a wavelength of 440 nm.

Also, among various lines representing astigmatism, a solid line indicates an image plane ΔS of a sagittal ray, and a dotted line indicates an image plane ΔM of a meridional ray. Among various lines representing transverse chromatic aberration, a two-dot chain line corresponds to a wavelength of 620 nm, a one-dot chain line corresponds to a wavelength of 470 nm, and a dotted line corresponds to a wavelength of 440 nm.

Fno denotes an F-number, and ω denotes a half angle of view.

Note that, in the zoom lenses according to the second and third exemplary embodiments, the wide-angle end and the telephoto end represent respective zooming positions obtained when the lens unit for use in zooming (i.e., magnification varying operation) reaches opposite ends of a range within which the lens unit is mechanically movable along an optical axis.

The optical system LE according to the exemplary embodiments includes the front lens group LF arranged closer to the object side than the aperture stop S and the rear lens group LR arranged closer to the image side than the aperture stop S. The front lens group LF includes at least one solid material element Ln made of a solid material.

The solid material element Ln is formed on at least one transmissive surface of a refractive optical element, such as a lens.

The rear lens group LR includes a diffractive optical element B.O including at least one diffractive optical portion Ld.

Herein, the term "refractive optical element" implies, for example, a refractive lens generating power with a refractive action, and it does not include a mostly diffractive optical element generating power with a diffractive action.

Also, the term "solid material" implies a material that is solid in a state where the optical system is practically used. In other words, the solid material can have any phase in a state before the optical system is practically used, e.g., during manufacturing. For example, a solid material resulting from hardening a material, which has been a liquid during manufacturing, is also covered by the term "solid material" used herein.

One example of the solid material is a mixture obtained by dispersing an ultraviolet curable resin or inorganic fine particles in a resin material.

It is here assumed that the Abbe number of the solid material with respect to the d line is νd and the partial dispersion ratio (relative partial dispersion) of the solid material with respect to the g line and the F line is θgF. Also, it is assumed that the thickness of the solid material element Ln and the thickness of the refractive optical element on which the solid material element Ln is formed are respectively dn and dg when measured on the optical axis.

Further, it is assumed that the focal length of the diffractive optical portion Ld of the diffractive optical element B.O and the focal length of the solid material element Ln in air are respectively fd and fn. On the above-described assumptions, the following conditional expression (1) or (2) is satisfied:

$$\theta gF < (-1.665 \times 10^{-7} \cdot \nu d^3 + 5.213 \times 10^{-5} \cdot \nu d^2 - 5.656 \times 10^{-3} \cdot \nu d + 0.700) \quad (1)$$

or $$\theta gF > (-1.665 \times 10^{-7} \cdot \nu d^3 + 5.213 \times 10^{-5} \cdot \nu d^2 - 5.656 \times 10^{-3} \cdot \nu d + 0.755) \quad (2)$$

In addition, the following conditional expressions (3) to (5) are satisfied:

$$\nu d < 60 \quad (3)$$

$$dn/dg < 0.50 \quad (4)$$

$$0.01 < |fn/fd| < 0.80 \quad (5)$$

Herein, the power (inverse number of the focal length) φD of the diffractive optical portion Ld is determined as follows.

A diffraction grating of the diffractive optical portion Ld is shaped such that the reference wavelength (d line) is λd, the distance from the optical axis is h, the phase coefficient is Ci (i=1, 2, 3, . . . ), and the phase function of the diffractive optical portion is φ(h). The phase function φ(h) is expressed by:

$$\phi(h) = (2\pi/\lambda d) \cdot (C1 \cdot h^2 + C2 \cdot h^4 + C3 \cdot h^6 + \dots)$$

From the coefficient C1 of the second-order term, the refractive power φD at the reference wavelength (d line) is provided as φD=−2·C1.

The optical system according to each of the exemplary embodiments includes the solid material element Ln made of the solid material satisfying the conditional expressions (1) and (3) or the conditional expressions (2) and (3). In addition, the solid material element Ln formed on the refractive optical element and the diffractive optical portion Ld of the diffractive optical element B.O satisfy the conditional expressions (4) and (5).

Assuming here the refractive indices of the solid material with respect to the g line, the F line, and the C line to be ng, nF, and nC, respectively, the partial dispersion ratio θgF is expressed by the following expression:

$$\theta gF = (ng - nF)/(nF - nC)$$

Also, assuming the refractive indices of the solid material with respect to the d line, the F line, and the C line to be nd, nF, and nC, respectively, the Abbe number νd is expressed by the following expression:

$$\nu d = (nd - 1)/(nF - nC)$$

The conditional expressions (1) to (3) define the ranges within which the properties of the solid material (e.g., the fine-particle dispersed material or the resin material) having the anomalous partial dispersion characteristic should be present.

On that occasion, it is desired that, of the conditional expressions (1) to (3), the conditional expressions (1) and (3) or (2) and (3) are simultaneously satisfied.

Figure 11:
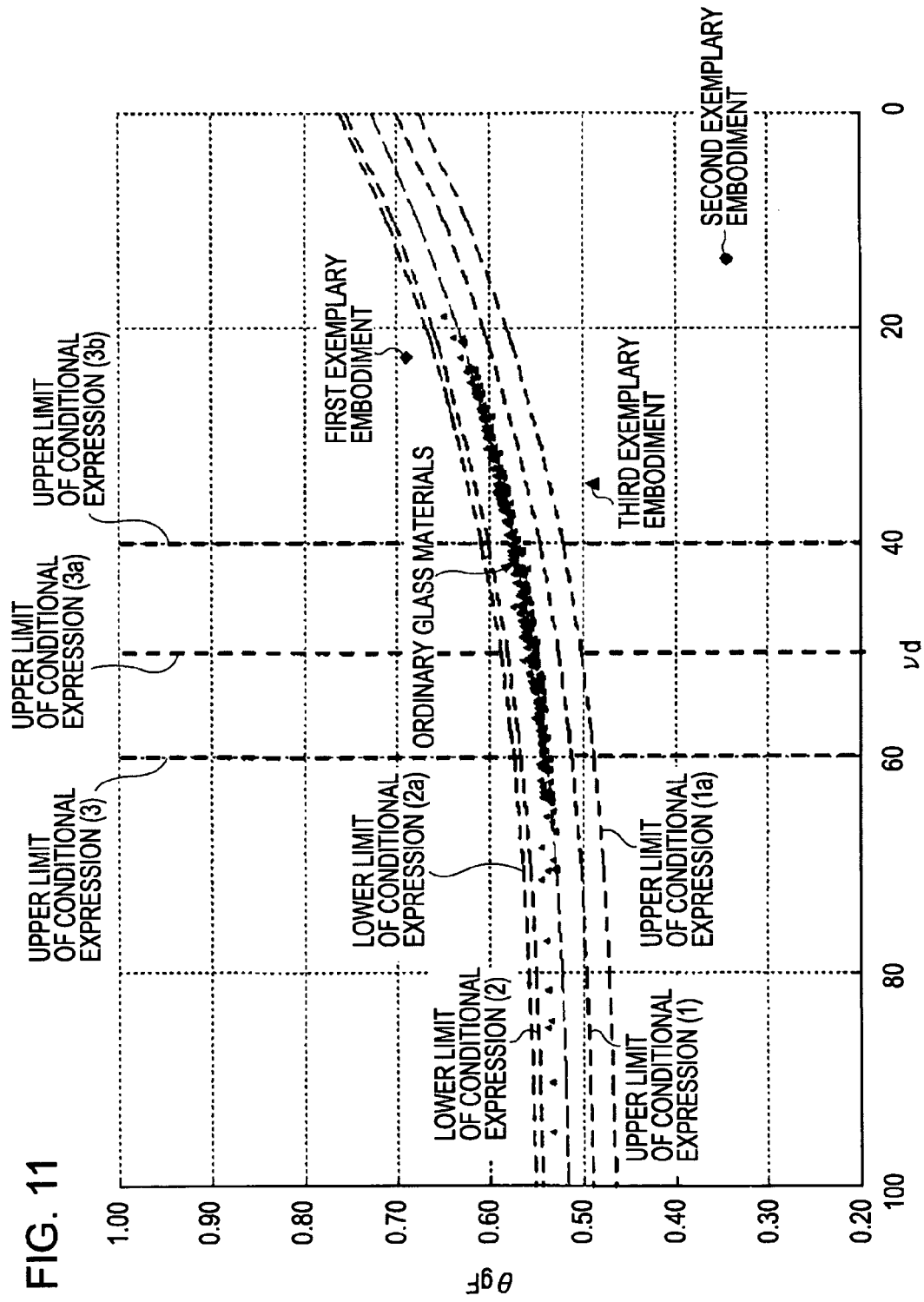
FIG. 11 is a graph for explaining materials having an anomalous partial dispersion characteristic, which are used in the exemplary embodiments of the present invention.

The relationships represented by those conditional expressions are now described with reference to FIG. 11. FIG. 11 is a graph illustrating the relationship between the partial dispersion ratio θgF and the Abbe number νd. In the graph, the vertical axis represents the partial dispersion ratio θgF, and the horizontal axis represents the Abbe number νd.

The solid material used in the exemplary embodiments is plotted in a region differing from the region within which ordinary glass materials are included, and it has the anomalous partial dispersion characteristic. Note that, if the solid material falls within the ranges defined by the conditional expressions (1) to (3), a solid material usable in practice is not limited to the solid material used in the exemplary embodiments.

If an upper limit value of the conditional expression (1) and a lower limit value of the conditional expression (2) are exceeded respectively above and below, such a material would have optical characteristics not differing from those of the ordinary glass materials, and would have a difficulty in correcting the chromatic aberrations. Further, if an upper limit value of the conditional expression (3) is exceeded above, it would also be difficult to correct the chromatic aberrations.

The conditional expression (4) defines the relationship in thickness between the solid material element Ln (made of, e.g., the fine-particle dispersed material or the resin material) having the anomalous partial dispersion characteristic and the lens (refractive optical element) with which the solid material element Ln is closely contacted.

If an upper limit value of the conditional expression (4) is exceeded above, the thickness of the solid material element Ln would be so large as to cause a difficulty in forming the solid material element Ln into a desired shape. Also, when the solid material is the fine-particle dispersed material, transmittance of the solid material would tend to decrease unsatisfactorily.

While the above description is made of the case where the solid material element Ln is formed on one surface of a lens having refractive power and the other surface of the lens is exposed to air, the arrangement of the solid material element Ln is not limited to that example. For example, the solid material element Ln can also be arranged such that both the surfaces thereof are contacted with lens surfaces.

Further, at least one surface of the solid material element Ln can be shaped into an aspherical surface.

The conditional expression (5) defines the relationship in focal length between the solid material element Ln (made of, e.g., the fine-particle dispersed material or the resin material) having the anomalous partial dispersion characteristic and the diffractive optical portion Ld. If an upper limit value of the conditional expression (5) is exceeded above, the refractive power of the solid material element Ln would be so large as to deteriorate the balance in the role of correcting the chromatic aberrations between the solid material element Ln and the diffractive optical portion Ld.

On the other hand, if a lower limit value of the conditional expression (5) is exceeded below, the refractive power of the diffractive optical portion Ld would be so weak as to cause a difficulty in correcting the chromatic aberrations. In addition, the thickness of the solid material element Ln would be increased unsatisfactorily.

Further, by setting the numerical ranges of the conditional expressions (1) to (5) as mentioned below, the effect of correcting the chromatic aberrations is increased and more satisfactory optical performance is obtained:

$$\theta gF<(-1.665\times10^{-7}\cdot vd^3+5.213\times10^{-5}\cdot vd^2-5.656\times10^{-3}\cdot vd+0.675) \quad (1a)$$

or $$\theta gF>(-1.665\times10^{-7}\cdot vd^3+5.213\times10^{-5}\cdot vd^2-5.656\times10^{-3}\cdot vd+0.662) \quad (2a)$$

$$vd<50 \quad (3a)$$

or, more desirably, $$vd<40 \quad (3b)$$

$$dn/dg<0.40 \quad (4a)$$

or, more desirably, $$dn/dg<0.30 \quad (4b)$$

and $$0.02<|fn/fd|<0.50 \quad (5a)$$

Thus, the solid material element (i.e., the element made of, e.g., the fine-particle dispersed material or the resin material) having the anomalous partial dispersion characteristic and the diffractive optical element are disposed at appropriate positions with appropriate powers.

As a result, a compact optical system can be realized in which the chromatic aberrations are sufficiently corrected. Further, the thickness of the solid material element can be set to a relatively small value.

The optical system according to the exemplary embodiments of the present invention can be provided by satisfying the above-described conditional expressions. In addition, however, one or more of the following conditional expressions are desirably satisfied for the purpose of sufficiently correcting the chromatic aberrations and further reducing the size of the entire optical system.

It is here assumed that f is the focal length of the entire optical system when the object distance is at infinity (in the case of the optical system being a zoom lens, f is the focal length of the entire optical system when the lens is at a telephoto end and the object distance is at infinity).

Also, it is assumed that Ln-i is the distance from the cemented surface between the refractive optical element and the solid material element Ln to the image plane when the object distance is at infinity, and that Ld-i is the distance from the diffractive optical portion Ld to the image plane when the object distance is at infinity.

The radius of curvature of the diffractive optical portion Ld is assumed to be Rd.

On the above-described assumptions, one or more of the following conditional expression (6) to (9) are desirably satisfied:

$$0.01<|f/fd|<0.20 \quad (6)$$

$$0.01<|f/fn|<0.90 \quad (7)$$

$$0.05<(Ld-i/Ln-i)<0.70 \quad (8)$$

$$0.10<|Rd/Ld-i|<10.0 \quad (9)$$

The conditional expression (6) defines the relationship in focal length between the diffractive optical portion Ld in the optical system and the entire optical system. If a lower limit value of the conditional expression (6) is exceeded below, the refractive power of the diffractive optical portion Ld would be so weak as to cause a difficulty in correcting the chromatic aberrations.

On the other hand, if an upper limit value of the conditional expression (6) is exceeded above, the refractive power of the diffractive optical portion Ld would be too large and the pitch of a grating portion would be too small, thus causing deterioration of diffraction efficiency.

Moreover, the following numerical range is desirably satisfied from the viewpoint of preventing deterioration of the diffraction efficiency.

$$0.01<|f/fd|<0.10 \quad (6a)$$

The conditional expression (7) defines the relationship in focal length between the solid material element Ln in the optical system and the entire optical system. If a lower limit value of the conditional expression (7) is exceeded below, the refractive power of the solid material element Ln would be so weak as to cause a difficulty in correcting the chromatic aberrations. In addition, the thickness of the solid material element Ln would be increased unsatisfactorily.

On the other hand, if an upper limit value of the conditional expression (7) is exceeded above, the refractive power of the solid material element Ln would be so large as to deteriorate balance in role of correcting the chromatic aberrations between the solid material element Ln and the diffractive optical portion Ld.

It is more desirable that the conditional expressions (7) and (6) are satisfied concurrently.

In addition, the following conditional expression (7a) is desirably satisfied. Satisfaction of the conditional expression (7a) contributes to increasing the effect of correcting the chromatic aberrations by the solid material element Ln and reducing the thickness of the solid material element Ln:

$$0.03 < |f/fn| < 0.80 \tag{7a}$$

The conditional expression (8) defines the relationship in layout between the solid material element Ln and the diffractive optical portion Ld in the optical system. If a lower limit value of the conditional expression (8) is exceeded below, this implies that the solid material element Ln would be arranged in a plane closest to the object side. Such a layout is not satisfactory from the viewpoint of resistance against environments.

On the other hand, if an upper limit value of the conditional expression (8) is exceeded above, the diffractive optical portion Ld would be positioned too close to the stop S, thus causing a difficulty in correcting the chromatic aberrations.

In addition, the following conditional expression (8a) is desirably satisfied. Satisfaction of the conditional expression (8a) enables the solid material element Ln and the diffractive optical portion Ld to take part in correcting the chromatic aberrations in a well balanced manner:

$$0.10 < (Ld-i/Ln-i) < 0.60 \tag{8a}$$

The conditional expression (9) defines the relationship between the distance from the diffractive optical portion Ld to the image plane and the radius of curvature of the diffractive optical portion Ld.

If a lower limit value of the conditional expression (9) is exceeded below, the radius of curvature of the diffractive optical portion Ld would be so small as to cause a difficulty in manufacturing the diffractive optical portion Ld.

On the other hand, if an upper limit value of the conditional expression (9) is exceeded above, the spacing between the diffractive optical portion Ld and the image plane would be too short and the spot diameter of unnecessary diffracted light near the diffracted light at the order of diffraction used in design would be too small. Hence, a flare due to the unnecessary diffracted light would be unsatisfactorily noticeable.

In addition, the following conditional expression (9a) is desirably satisfied. Satisfaction of the conditional expression (9a) is advantageous from the viewpoint of manufacturing the diffractive optical portion Ld and suppressing the flare due to the unnecessary diffracted light:

$$0.30 < |Rd/Ld-i| < 7.0 \tag{9a}$$

As described above, not only the position and the power of the diffractive optical portion of the diffractive optical element, but also the position, the refractive power, and the thickness of the solid material element, which is made of the solid material having the anomalous partial dispersion characteristic, are appropriately set. As a result, an optical system having good optical performance and a compact overall system size can be realized in which the chromatic aberrations are sufficiently corrected.

Embodiments of the diffractive optical element used in the exemplary embodiments will be described below.

Figure 12:
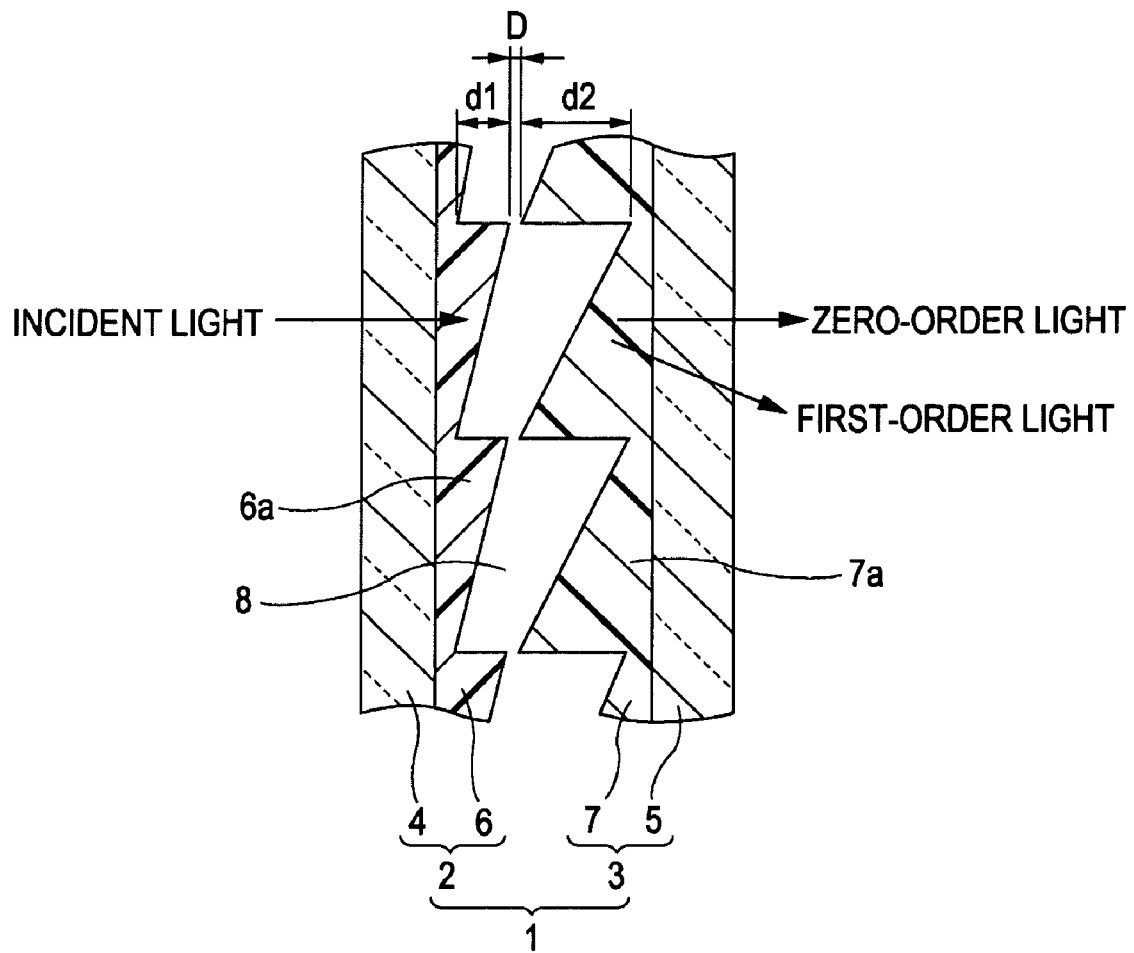
FIG. 12 is an explanatory view illustrating a diffractive optical element used in one exemplary embodiment of the present invention.
Figure 13:
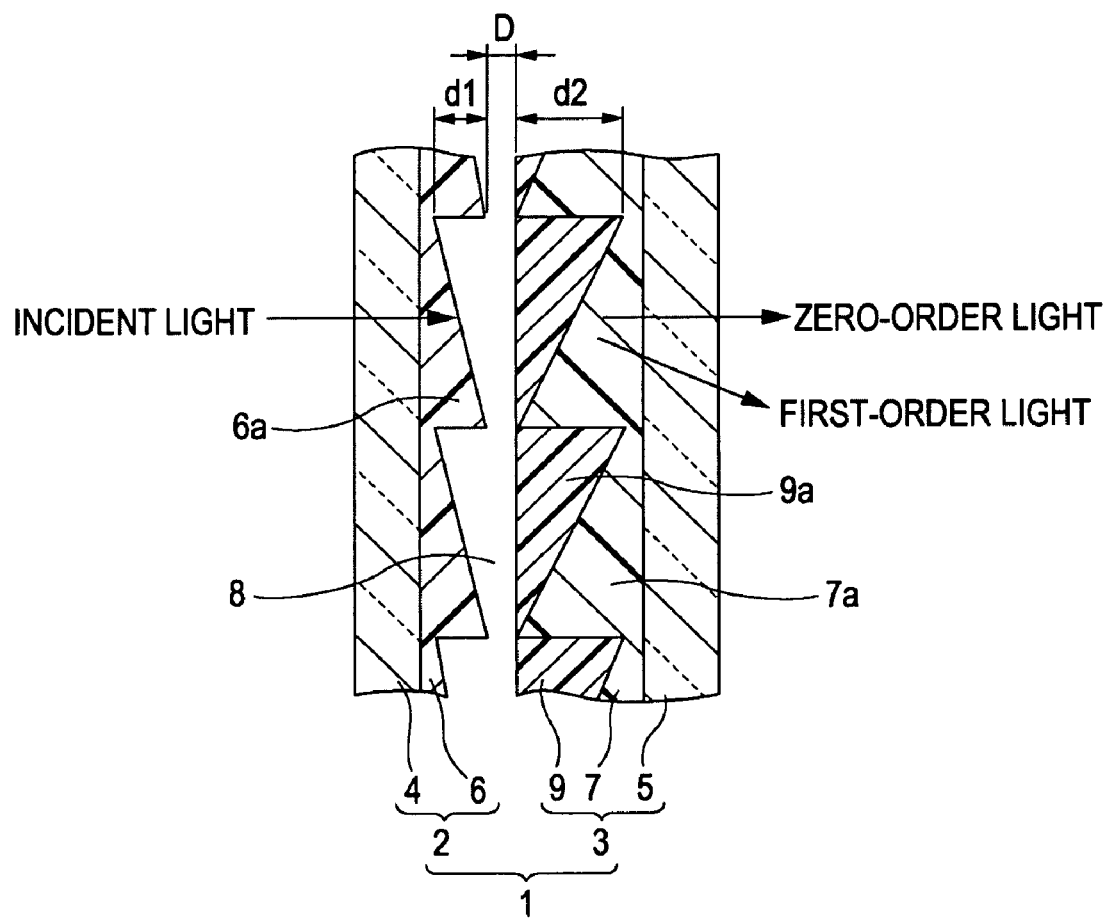
FIG. 13 is an explanatory view illustrating a diffractive optical element used in another exemplary embodiment of the present invention.
Figure 14:
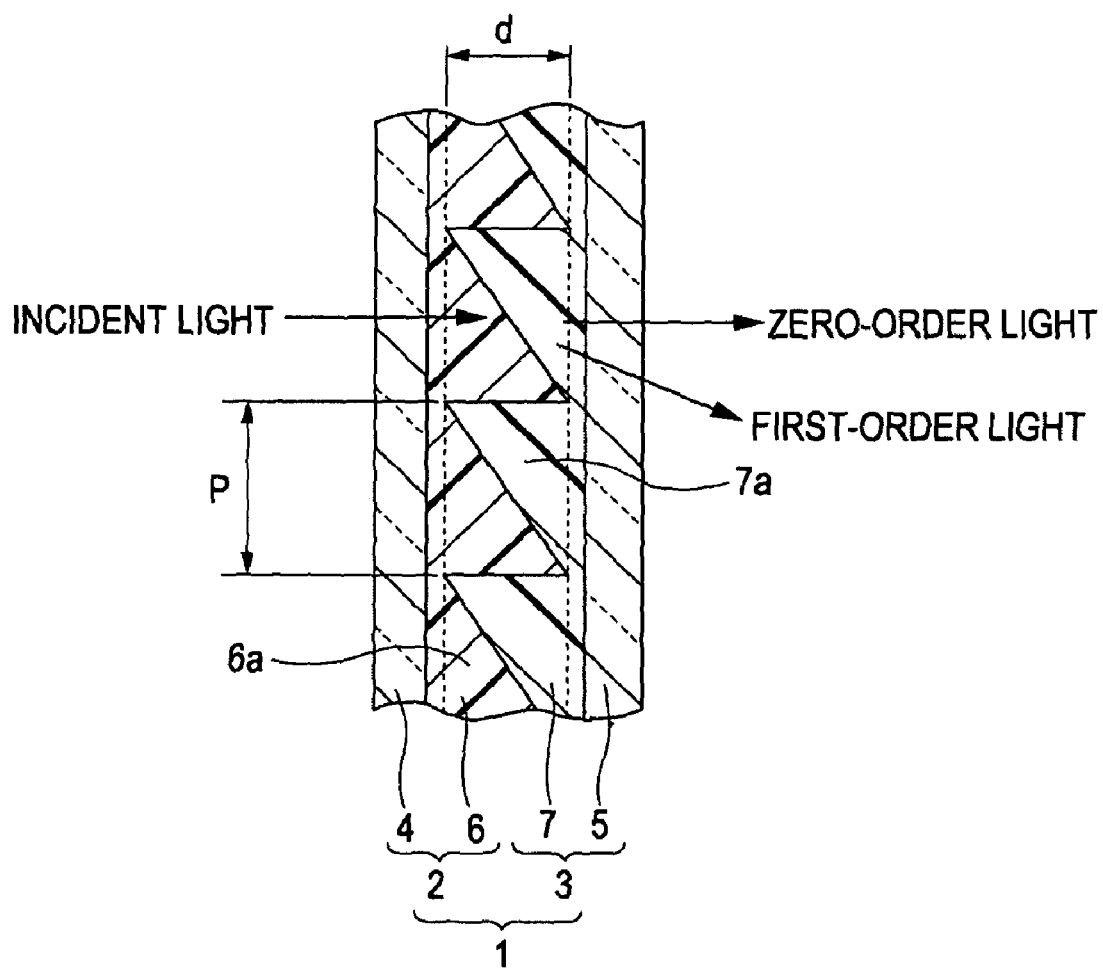
FIG. 14 is an explanatory view illustrating a diffractive optical element used in still another exemplary embodiment of the present invention.

The diffractive optical portion Ld constituting the diffractive optical element can be provided by stacking two or three diffraction gratings with an air layer interposed therebetween, as shown in FIGS. 12 and 13. Alternatively, the diffractive optical portion Ld can also be provided by arranging two diffraction gratings in a state closely contacted with each other, as shown in FIG. 14.

In a diffractive optical element 1 of FIG. 12, a first element portion 2 is constituted by forming a first diffraction grating 6, which is made of an ultraviolet curable resin, on one base (e.g., lens) 4. A second element portion 3 is constituted by forming a second diffraction grating 7, which is made of an ultraviolet curable resin differing from that used for the first diffraction grating 6, on the other base (e.g., lens) 5. Further, the first and second element portions 2 and 3 are arranged close to each other with a spacing D interposed as an air layer 8 between them.

The first and second diffraction gratings 6 and 7 cooperatively constitute one diffractive optical portion (diffractive optical surface). A combined unit of the first and second element portions 2 and 3 acts as one diffractive optical element. In such a diffractive optical element, the thickness of a grating portion 6a of the first diffraction grating 6 is d1, and the thickness of a grating portion 7a of the second diffraction grating 7 is d2.

The grating portions 6a and 7a are arranged such that, in the first diffraction grating 6, the thickness of the grating portion 6a is monotonously reduced in the vertical direction toward below from above as viewed in the drawing, and that, in the second diffraction grating 7, the thickness of the grating portion 7a is monotonously increased in the vertical direction toward below from above as viewed in the drawing. Further, as shown in FIG. 12, when incident light enters the diffractive optical element from the left side, light at the first order of diffraction advances obliquely downward right, and light at the zero order of diffraction advances straightforward.

Figure 15:
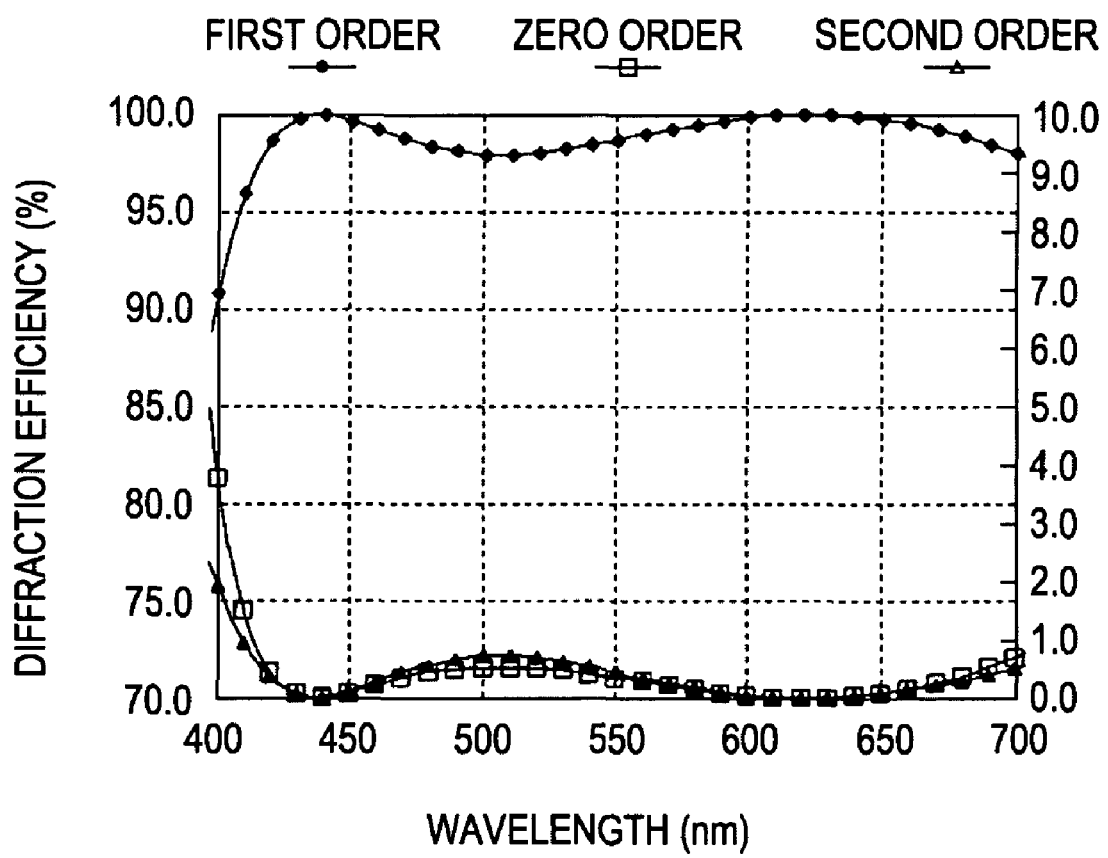
FIG. 15 is a graph illustrating diffraction efficiency of the diffractive optical element shown in FIG. 12.

FIG. 15 illustrates diffraction efficiencies of the first-order diffracted light, i.e., the light at the order of diffraction used in design, and the lights at the zero and second orders of diffraction, which differ ±1 from the order of diffraction used in design, in the diffractive optical portion shown in FIG. 12.

As element characteristics, the material of the first diffraction grating 6 has (nd1, vd1)=(1.636, 22.8), and the thickness of the grating portion 6a is d1=7.88 μm. The material of the second diffraction grating 7 has (nd2, vd2)=(1.524, 51.6), and the thickness of the grating portion 7a is d2=10.71 μm. The air spacing D is set to 1.5 μm. Further, the pitch of each of the grating portions 6a and 7a in FIG. 12 is P=200 μm.

As seen from FIG. 15, the diffraction efficiency of the first-order diffracted light, i.e., the light at the order of diffraction used in design, is about 90% or more in the entire visible range, while the diffraction efficiencies of the zero- and second-order diffracted lights, i.e., the lights at the unnecessary orders of diffraction, are about 5% or less in the entire visible range.

In a diffractive optical element 1 of FIG. 13, a first element portion 2 is constituted by forming a first diffraction grating 6, which is made of an ultraviolet curable resin, on one base 4. A second element portion 3 is constituted by forming a second diffraction grating 7, which is made of the same ultraviolet curable resin as that used for the first diffraction grating 6, and a third diffraction grating 9 on the other base 5. The diffraction grating 9 is formed by filling grooves of the diffraction grating 7 with a different ultraviolet curable resin.

Further, the first and second element portions 2 and 3 are arranged close to each other with a spacing D interposed as an air layer 8 between them.

Those three diffraction gratings 6, 7 and 9 cooperatively serve as one diffractive optical portion.

In such a diffractive optical portion, the thickness of a grating portion 6a of the first diffraction grating 6 is d1. The thickness of grating portions 7a and 9a of the second and third diffraction gratings 7 and 9 is d2. The grating portions are arranged such that, in each of the first diffraction grating 6 and the second diffraction grating 7, the thickness of the grating portion is monotonously increased in the vertical direction toward below from above as viewed in the drawing.

In the third diffraction grating 9, the grating portion is arranged in a direction reversal to that in the second diffraction grating 7. Further, as shown in FIG. 13, when incident light enters the diffractive optical portion from the left side, light at the first order of diffraction advances obliquely downward right, and light at the zero order of diffraction advances straightforward.

Figure 16:
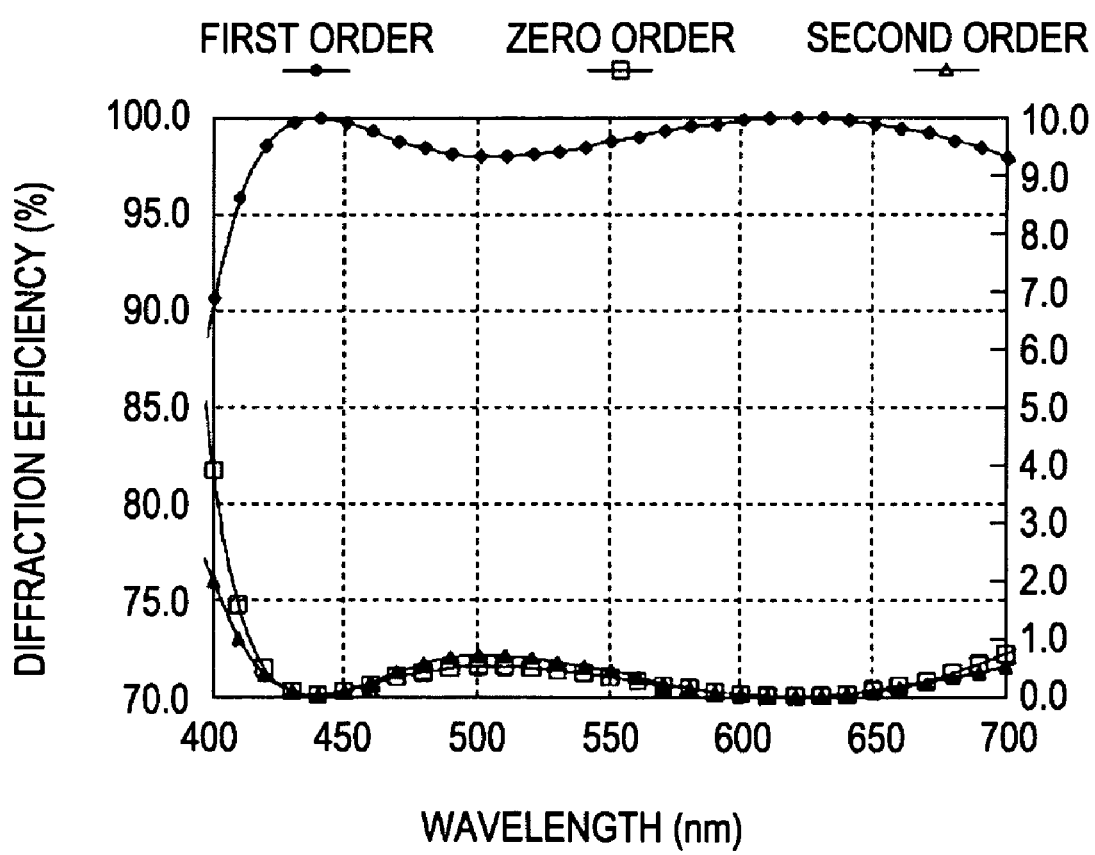
FIG. 16 is a graph illustrating diffraction efficiency of the diffractive optical element shown in FIG. 13.

FIG. 16 illustrates diffraction efficiencies of the first-order diffracted light, i.e., the light at the order of diffraction used in design, and the zero- and second-order diffracted lights in the diffractive optical portion shown in FIG. 13. As element characteristics, the material of the first diffraction grating 6 has (nd1, vd1)=(1.636, 22.8), and the thickness of the grating portion 6a is d1=2.83 µm. The materials of the second and third diffraction gratings 7 and 9 have (nd2-1, vd2-1)=(1.524, 51.6) and (nd3-2, vd3-2)=(1.636, 22.8), and the thicknesses of the grating portions 7a and 9a are d2=d3=7.88 µm. The air spacing D is set to 1.5 µm.

Further, the pitch of each of the grating portions 6a, 7a and 9a, shown in FIG. 13, is P=200 µm. As seen from FIG. 16, similarly to the case of FIG. 15, the diffraction efficiency of the first-order diffracted light, i.e., the light at the order of diffraction used in design, is about 90% or more in the entire visible range, while the diffraction efficiencies of the zero- and second-order diffracted lights are about 5% or less in the entire visible range.

In a diffractive optical element 1 of FIG. 14, a first element portion 2 is constituted by forming a first diffraction grating 6, which is made of an ultraviolet curable resin, on one base 4. A second element portion 3 is constituted by forming a second diffraction grating 7, which is made of an ultraviolet curable resin differing from that used for the first diffraction grating 6, on the other base 5. Respective grating portions 6a and 7a of the first and second diffraction gratings 6 and 7 have the same thickness d and are arranged in a state closely contacted with each other.

The first and second diffraction gratings 6 and 7 cooperatively constitute one diffractive optical portion (diffractive optical surface). The grating portions 6a and 7a are arranged such that, in the first diffraction grating 6, the thickness of the grating portion 6a is monotonously increased in the vertical direction toward below from above as viewed in the drawing, and that, in the second diffraction grating 7, the thickness of the grating portion 7a is monotonously reduced in the vertical direction toward below from above as viewed in the drawing. Further, as shown in FIG. 14, when incident light enters the diffractive optical element from the left side, light at the first order of diffraction advances obliquely downward right, and light at the zero order of diffraction advances straightforward.

Figure 17:
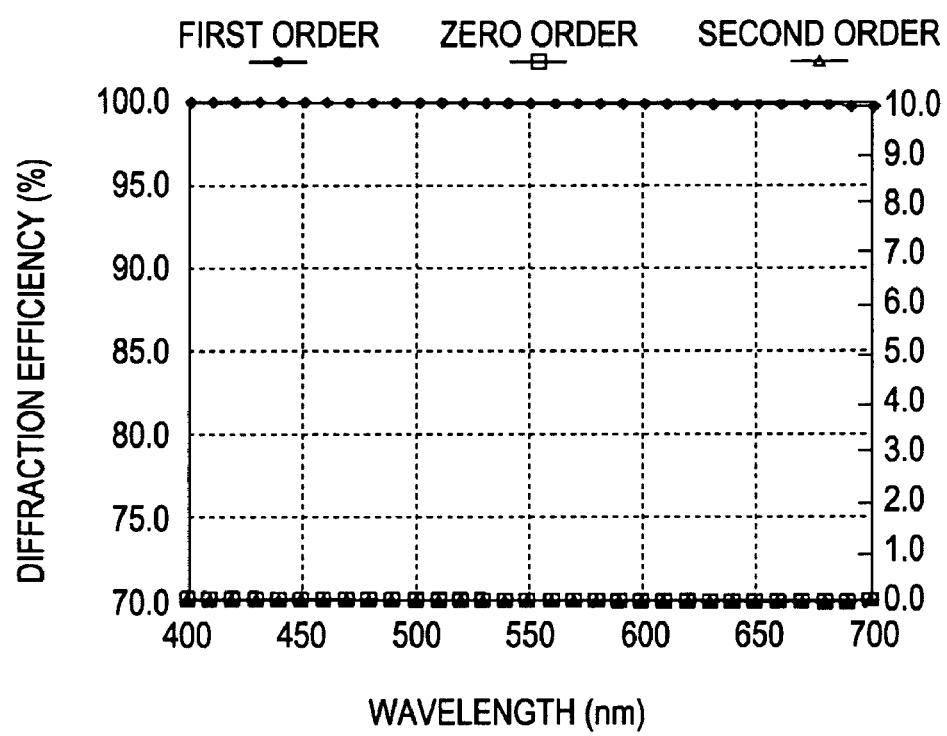
FIG. 17 is a graph illustrating diffraction efficiency of the diffractive optical element shown in FIG. 14.

FIG. 17 illustrates diffraction efficiencies of the first-order diffraction light, i.e., the light at the order of diffraction used in design, and the zero- and second-order diffracted lights in the diffractive optical portion shown in FIG. 14.

As element characteristics, the material of the first diffraction grating 6 has (nd1, vd1)=(1.567, 46.6), and the material of the second diffraction grating 7 has (nd2, vd2)=(1.504, 16.3). The grating portions 6a and 7a have the same thickness d=9.29 µm.

Further, the pitch of each of the grating portions 6a and 7a in FIG. 14 is P=200 µm. As seen from FIG. 17, the diffraction efficiency of the first-order diffraction light, i.e., the light of the order used in design, is about 99.5% or more in the entire visible range, while the diffraction efficiencies of the zero- and second-order diffraction lights, i.e., the lights of the unnecessary orders of diffraction, are about 0.05% or less in the entire visible range.

In the diffractive optical element according to the exemplary embodiments of the present invention, the effect of an aspherical surface can be provided by changing the pitch of the grating portion in the form of the diffraction grating, which constitutes the diffractive optical element.

If an off-axis ray enters, at a large incident angle, an optical surface in which the diffraction optical portion is disposed, the diffraction efficiency tends to reduce. For that reason, it is desired that the diffraction optical portion is disposed in a concentric lens surface.

The optical systems according to the exemplary embodiments will be described below in more detail.

The optical system according to the first exemplary embodiment, shown in FIG. 1, is a telephoto lens LE including a front lens group LF which is arranged closer to the object side than an aperture stop S and which has positive refractive power, and a rear lens group LR which is arranged closer to the image side than the aperture stop S and which has positive refractive power.

In FIG. 1, the left represents the object side and the right represents the image side.

The diffractive optical portion Ld is disposed at a cemented surface of a cemented lens constituting the diffractive optical element B.O, which is arranged within the rear lens group LR at a position closest to the image side.

The solid material element Ln made of the solid material, which satisfies the conditional expressions (2) and (3), and having positive refractive power is formed on a transmissive surface of a positive lens G1 on the side facing the image side, which is a refractive optical element arranged within the front lens group LF at a position closest to the object side. The solid material element Ln is made of an ultraviolet curable resin having characteristics of (nd, vd, θgF)=(1.636, 22.7, 0.69).

Further, as listed in Table 1 given below, the diffractive optical element B.O and the solid material element Ln satisfy the conditional expressions (4) to (9).

Focusing from an infinite to a short distance is performed by moving a cemented lens (Lfo) toward the image side, which is arranged within the front lens group LF at a position closest to the image side.

An image is displaced by moving a lens unit LIS, i.e., a part of the rear lens group LR which is arranged at a position closest to the object side, such that a component in a direction perpendicular to the optical axis is produced. This is effective in correcting a motion blur of the image caused by hand shake.

In this exemplary embodiment, axial chromatic aberration and transverse chromatic aberration are corrected by forming the solid material element Ln made of the ultraviolet curable resin having the anomalous partial dispersion characteristic on the surface of a first lens G1 on the side closer to the image, which is located at a position where the height h of incidence of a paraxial marginal ray is high and the height $\bar{h}$ of incidence of a paraxial chief ray is also high.

Also, deficiency in correction of the transverse chromatic aberration, made by the solid material element Ln, is compensated for and the thickness of the solid material element Ln is reduced by employing the diffractive optical element B.O, including the diffraction optical portion Ld, as the lens which is arranged closer to the image side than the stop S and which is located at a position where the height $\bar{h}$ of incidence of a paraxial chief ray is high.

In addition, with the diffractive optical element B.O arranged at a position closest to the image side, strong light coming from the outside of a frame, e.g., the sunlight, is hard to directly enter the diffractive optical element B.O, and the occurrence of a flare ghost, etc. is suppressed.

The optical system according to the second exemplary embodiment, shown in FIG. 3, is a zoom lens LE including a front lens group LF which is arranged closer to the object side than an aperture stop S and which has positive refractive power, and a rear lens group LR which is arranged closer to the image side than the aperture stop S and which has negative refractive power. Each of the front lens group LF and the rear lens group LF includes a plurality of lens units, and zooming is performed with movements of the plurality of lens units.

In FIG. 3, the left represents the object side and the right represents the image side.

The front lens group LF includes a first lens unit L1 having positive refractive power, a second lens unit L2 having negative refractive power, and a third lens unit L3 having positive refractive power. The rear lens group LR includes a fourth lens unit L4 having negative refractive power, a fifth lens unit L5 having positive refractive power, a sixth lens unit L6 having negative refractive power, and a seventh lens unit L3 having positive refractive power.

The seventh lens unit L7 is constituted by the diffractive optical element B.O which is in the form of a cemented lens and which includes the diffraction optical portion Ld at a cemented surface thereof. The solid material element Ln made of the solid material, which satisfies the conditional expressions (1) and (3), and having positive refractive power is disposed on a transmissive surface of a positive lens G3 on the side facing the image side. The positive lens G3 is a refractive optical element constituting a cemented lens G2$a$ and arranged closer to the image side, the cemented lens G2$a$ being arranged within the first lens unit L1 at a second position counting from the object side.

Herein, the solid material element Ln is made of a material prepared by mixing, in an ultraviolet curable resin, a fine-particle dispersed material (ITO) having characteristics of (nd, vd, θgF)=(1.572, 13.5, 0.34). Further, as listed in Table 1 given later, the diffractive optical element B.O and the solid material element Ln satisfy the conditional expressions (4) to (9).

Focusing from an infinite to a short distance is performed by moving the sixth lens unit L6 (Lfo) toward the image side, which is arranged within the front lens group LF at a position closest to the image side. In addition, a motion blur of an image, caused by hand shake for example, is corrected by moving the second lens unit L2 (LIS) such that a component in a direction perpendicular to the optical axis is produced.

In zooming from a wide-angle end toward a telephoto end, the first to sixth lenses are moved as indicated by respective arrows. More specifically, the first lens unit L1, the third lens unit L3, and the sixth lens unit L6 are moved toward the object side. More exactly speaking, the sixth lens unit L6 is moved so as to follow a locus that is convex toward the image side.

The second lens unit L2, the fourth lens unit L4, and the fifth lens unit L5 are moved toward the image side. The seventh lens L7 is held stationary during the zooming.

In this second exemplary embodiment, the solid material element Ln made of the fine-particle dispersed material having the anomalous partial dispersion characteristic is disposed on the transmissive surface of the lens G3 (constituting the cemented lens G2$a$ within the first lens unit L1) on the side closer to the image, which is located at a position where the height h of incidence of a paraxial marginal ray is high and the height h of incidence of a paraxial chief ray is also high. With such an arrangement, axial chromatic aberration and transverse chromatic aberration are corrected. Also, the diffractive optical element B.O is employed as the lens (i.e., the cemented lens of the seventh lens unit L7) which is arranged closer to the image side than the stop S and which is located at a position where the height $\bar{h}$ of incidence of a paraxial chief ray is high. Such an arrangement is effective in assisting the solid material element Ln, which is made of the fine-particle dispersed material, to correct the transverse chromatic aberration. Further, such an arrangement contributes to reducing the thickness of the solid material element Ln. In addition, with the diffractive optical element B.O arranged at a position closest to the image side, strong light coming from the outside of a frame, e.g., the sunlight, is hard to directly impinge against the diffraction optical portion Ld of the diffractive optical element B.O, and the occurrence of a flare ghost, etc. is suppressed.

The optical system according to the third exemplary embodiment, shown in FIG. 7, is a zoom lens LE for a projector. The zoom lens LE includes a front lens group LF which is arranged closer to a screen SC than an aperture stop S and which has positive refractive power. The zoom lens LE also includes a rear lens group LR which is arranged closer to a projected image IP than the aperture stop S and which has positive refractive power. Zooming is performed with movements of a plurality of lens units included in each of the front lens group LF and the rear lens group LR.

The front lens group LF includes a first lens unit L1 having negative refractive power, a second lens unit L2 having positive refractive power, and a third lens unit L3 having positive refractive power. The rear lens group LR includes a fourth lens unit L4 having negative refractive power, a fifth lens unit L5 having positive refractive power, and a sixth lens unit L6 having positive refractive power. The sixth lens unit L6 is constituted by the diffractive optical element B.O which is in the form of a cemented lens and which includes the diffraction optical portion Ld at a cemented surface thereof.

The solid material element Ln made of the solid material, which satisfies the conditional expressions (1) and (3), is disposed on a transmissive surface of a positive lens G1 on the side facing the image side, which is arranged within the first lens unit L1 at a position closest to the object side.

Herein, the solid material element Ln is made of a material prepared by mixing, in an ultraviolet curable resin, a fine-particle dispersed material (ITO) having characteristics of (nd, vd, θgF)=(1.510, 34.5, 0.49). Further, as listed in Table 1 given later, the diffractive optical element B.O and the solid material element Ln satisfy the conditional expressions (4) to (9).

Focusing from an infinite to a short distance is performed by moving the first lens unit L1 (Lfo) toward the object side. In zooming from a wide-angle end toward a telephoto end, the second to fifth lenses are moved as indicated by respective arrows. More specifically, the second lens unit L2, the third lens unit L3, the fourth lens unit L4, and the fifth lens unit L5 are moved toward the object side. The first lens unit L1 and the sixth lens unit L6 are held stationary during the zooming.

In this third exemplary embodiment, the diffractive optical element B.O including the diffractive optical portion Ld is employed as the lens (i.e., the cemented lens of the sixth lens unit L6) which is arranged closer to the image side and which is located at a position where the height h of incidence of a paraxial marginal ray is high and the height $\bar{h}$ of incidence of a paraxial chief ray is also high. With such an arrangement, axial chromatic aberration and transverse chromatic aberration are corrected. Also, the solid material element Ln made of the fine-particle dispersed material having the anomalous partial dispersion characteristic is disposed on the transmissive surface, on the side facing the image, of the positive lens G1 serving as a refractive optical element within the first lens group L1, which is arranged closer to the screen SC than the stop S and which is located at a position where the height $\bar{h}$ of incidence of a paraxial chief ray is high. Such an arrangement is effective in assisting the correction of the transverse chromatic aberration.

Numerical examples of the present invention will be described below.

In each of the following numerical example, i represents the order of a surface when counted from the object side. Also, ri represents the radius of curvature of the i-th lens surface when counted from the object side, and di represents the i-th axial surface-to-surface interval in a reference state, when counted from the object side. Further, ndi and vdi represent respectively the refractive index and the Abbe number of the i-th optical member with respect to the d line. Fno represents the F number, and BF represents a back focus calculated in terms of air.

Assuming that the order of diffraction of the diffracted light is m, the design wavelength is λ0, and the height in the direction perpendicular to the optical axis is h, and the phase coefficient is Ci (i=1, 2, 3, . . . ), the phase shape ψ of a diffractive optical surface in each of the above-described examples is expressed by the following expression:

$$\psi(h,m) = (2\pi/m\lambda 0) * (C1 \cdot h^2 + C2 \cdot h^4 + C3 \cdot h^6 + \ldots)$$

Further, the shape of a spherical surface is defined by using X that represents the amount of displacement from the surface vortex in the axial direction, and h that represents the height in the direction perpendicular to the optical axis. In addition, assuming that r is the paraxial radius of curvature, k is the conic constant, and B, C, D, E . . . are the aspherical coefficients at respective orders, X can be expressed by the following expression:

$$X(h) = \frac{(1/r)h^2}{1 + \sqrt{1 - (1+k)(h/r)^2}} + Bh^4 + Ch^6 + Dh^8 + Eh^{10} + \ldots$$

Table 1 lists the relationships between the above-described conditional expressions and numerical values used in the numerical examples.

Numerical Example 1

| Unit | mm |
|---|---|
| Focal Length | 585.00 |
| Fno | 4.12 |
| Angle of View | 4.24 |
| Image Height | 21.64 |
| Overall Lens Length | 402.52 |
| BF | 67.92 |

| Surface Data | | | | | |
|---|---|---|---|---|---|
| Surface No. | r | d | nd | vd | Effective Diameter |
| Object Plane | ∞ | ∞ | | | |
| 1 | 137.302 | 23.57 | 1.48749 | 70.2 | 141.99 |
| 2 | 1072.651 | 5.00 | 1.63555 | 22.7 | 139.68 |
| 3 | −1534.215 | 32.22 | | | 139.27 |
| 4 | 110.965 | 13.43 | 1.49700 | 81.5 | 108.16 |
| 5 | 550.128 | 5.33 | | | 106.62 |
| 6 | −557.521 | 4.00 | 2.00330 | 28.3 | 106.39 |
| 7 | 246.906 | 3.21 | | | 101.65 |
| 8 | 119.244 | 19.28 | 1.43384 | 95.2 | 98.40 |
| 9 | −914.752 | 0.15 | | | 94.43 |
| 10 | 63.666 | 5.30 | 1.43875 | 94.9 | 80.86 |
| 11 | 47.866 | 48.02 | | | 72.75 |
| 12 | −39183.386 | 3.50 | 2.00330 | 28.3 | 49.00 |
| 13 | −169.313 | 1.80 | 1.83481 | 42.7 | 48.42 |
| 14 | 82.052 | 0.00 | | | 45.76 |
| 15 | ∞ | 26.36 | | | 46.53 |
| 16 (stop) | ∞ | 0.17 | | | 40.31 |
| 17 | 209.488 | 1.30 | 2.00330 | 28.3 | 40.05 |
| 18 | 52.107 | 5.86 | 1.71300 | 53.9 | 39.16 |
| 19 | 89.636 | 1.50 | | | 38.68 |
| 20 | 57.034 | 5.00 | 1.63854 | 55.4 | 39.01 |
| 21 | 225.833 | 6.80 | 1.60562 | 43.7 | 38.51 |
| 22 | 1464.161 | 10.08 | | | 37.22 |
| 23 | −68.262 | 1.30 | 1.88300 | 40.8 | 34.71 |
| 24 | 2237.697 | 2.00 | | | 34.99 |
| 25 | −192.953 | 7.00 | 1.84666 | 23.8 | 35.18 |
| 26 | −58.561 | 3.00 | 1.88300 | 40.8 | 36.03 |

| | -continued | | | | |
|---|---|---|---|---|---|
| 27 | −63.210 | 80.71 | | | 36.60 |
| 28 | 83.358 | 10.00 | 1.57135 | 53.0 | 41.05 |
| 29 (diffraction surface) | −39.960 | 3.71 | 1.60300 | 65.4 | 40.87 |
| 30 | 150.915 | 3.00 | | | 40.11 |
| 31 | ∞ | 2.00 | 1.51633 | 64.2 | 40.19 |
| Image Plane | ∞ | | | | |

| Diffraction Surface Data 29-Th Surface | |
|---|---|
| C1 | 8.43497E−05 |
| C2 | 6.35035E−09 |
| C3 | −4.14939E−11 |

Numerical Example 2

| | mm | | |
|---|---|---|---|
| Unit | Wide-Angle End | Intermediate Zooming Position | Telephoto End |
| Focal Length | 72.50 | 135.50 | 290.90 |
| Fno | 4.66 | 4.97 | 5.87 |
| Angle of View | 33.23 | 18.14 | 8.51 |
| Image Height | 21.64 | 21.64 | 21.64 |
| Overall Lens Length | 151.20 | 175.81 | 214.20 |
| BF | 40.04 | 40.04 | 40.04 |

| Surface Data | | | | | |
|---|---|---|---|---|---|
| Surface No. | r | d | nd | vd | Effective Diameter |
| Image Plane | ∞ | ∞ | | | |
| 1 | 148.037 | 4.78 | 1.56384 | 60.7 | 57.56 |
| 2 | −737.878 | 0.15 | | | 57.23 |
| 3 | 61.535 | 1.50 | 2.00330 | 28.3 | 54.27 |
| 4 | 49.753 | 7.83 | 1.48749 | 70.2 | 52.42 |
| 5* | 323.186 | 1.50 | 1.57160 | 13.5 | 51.70 |
| 6 | 218.303 | variable | | | 50.72 |
| 7 | ∞ | 1.48 | | | 21.23 |
| 8 | −139.062 | 1.50 | 1.60300 | 65.4 | 20.20 |
| 9 | 34.828 | 2.64 | | | 19.53 |
| 10 | −44.236 | 1.50 | 1.69350 | 53.2 | 19.53 |
| 11 | 35.876 | 2.69 | 2.00330 | 28.3 | 20.32 |
| 12 | 293.553 | variable | | | 20.42 |
| 13 | 38.281 | 1.50 | 1.92286 | 18.9 | 20.95 |
| 14 | 27.990 | 4.99 | 1.48749 | 70.2 | 20.62 |
| 15* | −32.739 | 1.00 | | | 20.65 |
| 16 (stop) | ∞ | variable | | | 19.09 |
| 17 | −20.841 | 1.50 | 1.51633 | 64.1 | 19.06 |
| 18 | 27.706 | 3.46 | 1.69895 | 30.1 | 20.59 |
| 19 | −604.437 | variable | | | 20.79 |
| 20 | −128.523 | 3.67 | 1.51633 | 64.1 | 21.69 |
| 21 | −23.268 | 0.15 | | | 21.98 |
| 22 | 97.878 | 5.01 | 1.53996 | 59.5 | 21.41 |
| 23 | −19.708 | 1.50 | 2.00330 | 28.3 | 21.40 |
| 24 | −57.813 | 0.15 | | | 22.41 |
| 25 | 67.900 | 3.42 | 1.60300 | 65.4 | 22.80 |
| 26 | −57.227 | variable | | | 22.82 |
| 27 | 82.443 | 1.50 | 1.88300 | 40.8 | 20.28 |
| 28 | 23.592 | 2.29 | | | 19.31 |
| 29 | −1759.700 | 3.21 | 1.84666 | 23.8 | 19.34 |
| 30 | −27.495 | 1.50 | 1.88300 | 40.8 | 19.57 |
| 31 | 88.250 | variable | | | 20.37 |
| 32 | 44.586 | 3.36 | 1.64769 | 33.8 | 36.93 |
| 33 (diffraction surface) | 83.922 | 1.50 | 1.48749 | 70.2 | 36.85 |
| 34 | 88.009 | | | | 36.83 |
| Image Plane | ∞ | | | | |

-continued

Diffraction Surface Data
33-Th Surface

| | |
|---|---|
| C1 | −4.56068E−05 |
| C2 | 4.59548E−08 |
| C3 | −2.54253E−10 |

Aspherical Surface Data
6-Th Surface

| | |
|---|---|
| k | −2.01028 |
| B | 2.30792E−08 |
| C | −6.52447E−11 |
| D | 3.69853E−14 |

16-Th Surface

| | |
|---|---|
| k | −1.42357 |
| B | 2.12160E−06 |
| C | −3.94118E−09 |
| D | 1.37187E−11 |

Focal Length

| Variable Length | 72.50 | 135.50 | 290.90 |
|---|---|---|---|
| 6 | 1.30 | 26.62 | 58.14 |
| 12 | 13.58 | 1.88 | 1.20 |
| 16 (stop) | 3.50 | 11.70 | 18.97 |
| 19 | 5.97 | 4.07 | 1.60 |
| 26 | 11.14 | 12.26 | 1.20 |
| 31 | 10.29 | 13.70 | 27.68 |

Numerical Example 3

| Unit | Wide-Angle End | Intermediate Zooming Position | Telephoto End |
|---|---|---|---|
| | mm | | |
| Focal Length | 28.81 | 31.26 | 34.43 |
| Fno | 1.60 | 1.98 | 2.10 |
| Angle of View | 46.91 | 43.59 | 39.91 |
| Image Height | 12.50 | 12.50 | 12.50 |
| Overall Lens Length | 122.33 | 122.33 | 122.33 |
| BF | 6.00 | 6.00 | 6.00 |

Surface Data

| Surface No. | r | d | nd | vd | Effective Diameter |
|---|---|---|---|---|---|
| Object Plane | ∞ | ∞ | | | |
| 1 | 68.184 | 3.07 | 2.00330 | 28.3 | 35.20 |
| 2 | 230.128 | 0.80 | 1.51035 | 34.5 | 34.23 |
| 3 | 539.080 | 0.15 | | | 33.84 |
| 4 | 40.603 | 1.50 | 1.88300 | 40.8 | 29.75 |
| 5 | 21.337 | 5.94 | | | 26.15 |
| 6 | −64.906 | 1.50 | 1.92286 | 18.9 | 26.03 |
| 7 | 61.843 | variable | | | 25.27 |
| 8 | −1540.116 | 2.99 | 2.00330 | 28.3 | 25.36 |
| 9 | −50.003 | 0.15 | | | 25.40 |
| 10 | 45.893 | 1.50 | 1.51633 | 64.1 | 23.69 |
| 11 | 20.043 | 3.20 | 1.92286 | 18.9 | 22.01 |
| 12 | 38.067 | variable | | | 21.06 |
| 13 | ∞ | 0.00 | | | 21.15 |
| 14 | 25.164 | 3.92 | 1.60562 | 43.7 | 21.24 |
| 15 | −317.341 | variable | | | 20.79 |
| 16 (stop) | ∞ | 0.51 | | | 19.62 |
| 17 | −188.952 | 1.50 | 1.84666 | 23.8 | 19.48 |
| 18 | 36.271 | variable | | | 18.73 |
| 19 | −18.410 | 1.50 | 1.84666 | 23.8 | 18.74 |
| 20 | 67.817 | 6.40 | 1.60300 | 65.4 | 23.90 |
| 21 | −23.038 | 0.15 | | | 25.77 |

-continued

| | | | | | |
|---|---|---|---|---|---|
| 22 | −359.810 | 4.19 | 2.00330 | 28.3 | 30.77 |
| 23 | −41.751 | variable | | | 31.64 |
| 24 | 65.675 | 3.19 | 1.88300 | 40.8 | 34.22 |
| 25 (diffraction surface) | 302.281 | 2.84 | 1.83481 | 42.7 | 34.17 |
| 26 | −152.148 | 1.82 | | | 34.12 |
| 27 | ∞ | 41.50 | 1.62299 | 58.2 | 50.00 |
| 28 | ∞ | 0.00 | | | 50.00 |
| 29 | ∞ | 2.60 | 1.51633 | 64.1 | 40.00 |
| 30 | ∞ | | | | 40.00 |
| Image Plane | ∞ | | | | |

Diffraction Surface Data
25-Th Surface

| | |
|---|---|
| C1 | −3.12518E−04 |
| C2 | 2.86030E−07 |
| C3 | −4.12902E−11 |

| | Focal Length | | |
|---|---|---|---|
| Variable Length | 28.81 | 31.26 | 34.43 |
| 7 | 3.90 | 2.80 | 1.75 |
| 12 | 7.91 | 5.73 | 2.50 |
| 15 | 1.85 | 3.42 | 5.15 |
| 18 | 11.25 | 10.10 | 8.90 |
| 23 | 0.50 | 3.36 | 7.11 |

TABLE 1

| Conditional Expression | Numerical Example | | |
|---|---|---|---|
| | 1 | 2 | 3 |
| (1) | — | 0.343 | 0.490 |
| (2) | 0.689 | — | — |
| (3) | 22.73 | 13.51 | 34.53 |
| (4) | 0.212 | 0.191 | 0.260 |
| (5) | 0.306 | 0.039 | 0.391 |
| (6) | 0.099 | 0.027 | 0.022 |
| (7) | 0.323 | 0.686 | 0.055 |
| (8) | 0.202 | 0.208 | 0.459 |
| (9) | 0.521 | 2.022 | 5.520 |

FIG. 18 is schematic view of principal parts of a liquid crystal projector (image display apparatus) employing, as a projection lens, the optical system according to an exemplary embodiment of the present invention. More specifically, the image display apparatus, shown in FIG. 18, is a color liquid crystal projector of three-plate type in which light of plural colors from three liquid crystal panels (image forming devices), which form original projection images, are combined with one another by a color combining unit and are projected in an enlarged scale onto a screen 104 through a projection lens 103.

In a color liquid crystal projector 100 of FIG. 18, respective color lights from three liquid crystal panels 105G, 105B and 105R of RGB, which are illuminated by light from an illumination optical system, are combined into one optical path through a prism 102 serving as the color combining unit. The combined lights are projected onto the screen 104 through the projection lens (optical system) 103.

FIG. 19 is schematic view of principal parts of an image pickup apparatus, such as a digital camera, in which an optical system according to an exemplary embodiment of the present invention is employed as an imaging lens. In FIG. 19, 106 denotes a digital camera (image pickup apparatus). The imaging lens 108 forms an image of an object 109 at an image pickup device 107 which receives the object image. Image information is thus obtained.

Such an exemplary embodiment can provide an image pickup apparatus, e.g., a video camera or a digital camera, which forms image information on an image pickup device, e.g., a CCD sensor.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-028767 filed Feb. 8, 2008, which is hereby incorporated by reference herein in its entirety.

What is claimed is:

1. An optical system including a front lens group, a stop, and a rear lens group, which are arranged successively in order from the object side toward the image side, wherein:

the front lens group includes a refractive optical element and a solid material element having a refractive action, the solid material element formed on at least one transmissive surface of the refractive optical element, the rear lens group includes a diffractive optical element, and the following conditional expressions are satisfied:

$$vd<60,$$

$$dn/dg<0.50,$$

$$0.01<|fn/fd|<0.80, \text{ and either}$$

$$\theta gF<(-1.665\times10^{-7}\cdot vd^3+5.213\times10^{-5}\cdot vd^2-5.656\times10^{-3}\cdot vd+0.700) \text{ or}$$

$$\theta gF>(-1.665\times10^{-7}\cdot vd^3+5.213\times10^{-5}\cdot vd^2-5.656\times10^{-3}\cdot vd+0.755),$$

where vd is an Abbe number of a solid material of the solid material element with respect to the d line, dn and dg are respectively a thickness of the solid material element and a thickness of the refractive optical element when measured on the optical axis, fd and fn are respectively a focal length of a diffractive optical portion of the diffractive optical element and a focal length of the solid material element in air, and θgF is a partial dispersion ratio of the solid material with respect to the g line and the F line.

2. The optical system according to claim 1, wherein the following conditional expression is satisfied:

$0.01<|f/fd|<0.20$ where f is a focal length of the entire optical system.

3. The optical system according to claim 1, wherein the following conditional expression is satisfied:

$0.01<|f/fn|<0.90$ where f is a focal length of the entire optical system.

4. The optical system according to claim 1, wherein the following conditional expression is satisfied:

$0.05<(Ld-i/Ln-i)<0.70$ where Ln–i is a distance from a cemented surface between the refractive optical element and the solid material element to an image plane, and Ld–i is a distance from the diffractive optical portion of the diffractive optical element to the image plane.

5. The optical system according to claim 1, wherein the solid material is a mixture obtained by dispersing an ultraviolet curable resin or inorganic fine particles in a resin material.

6. The optical system according to claim 1, wherein the following conditional expression is satisfied:

$0.10<|Rd/Ld-i|<10.0$ where Rd is a radius of curvature of the diffractive optical portion of the diffractive optical element, and Ld–i is a distance from the diffractive optical portion to the image plane.

7. The optical system according to claim 1, wherein the diffractive optical portion of the diffractive optical element is disposed at a cemented surface of a cemented lens.

8. An image pickup apparatus including:
   the optical system according to claim 1, and
   an image pickup device arranged to receive an image formed by the optical system.

9. An image display apparatus including:
   the optical system according to claim 1,
   an image forming device configured to form an original projection image, and
   an illumination optical system configured to illuminate the image forming device.

* * * * *